INVENTORS
ROBERT C. TRESEDER
KENNETH L. BERNINGER
WILLIAM A. WEIS
ALBERT P. DINSMORE
GARTHWOOD R. TAYLOR

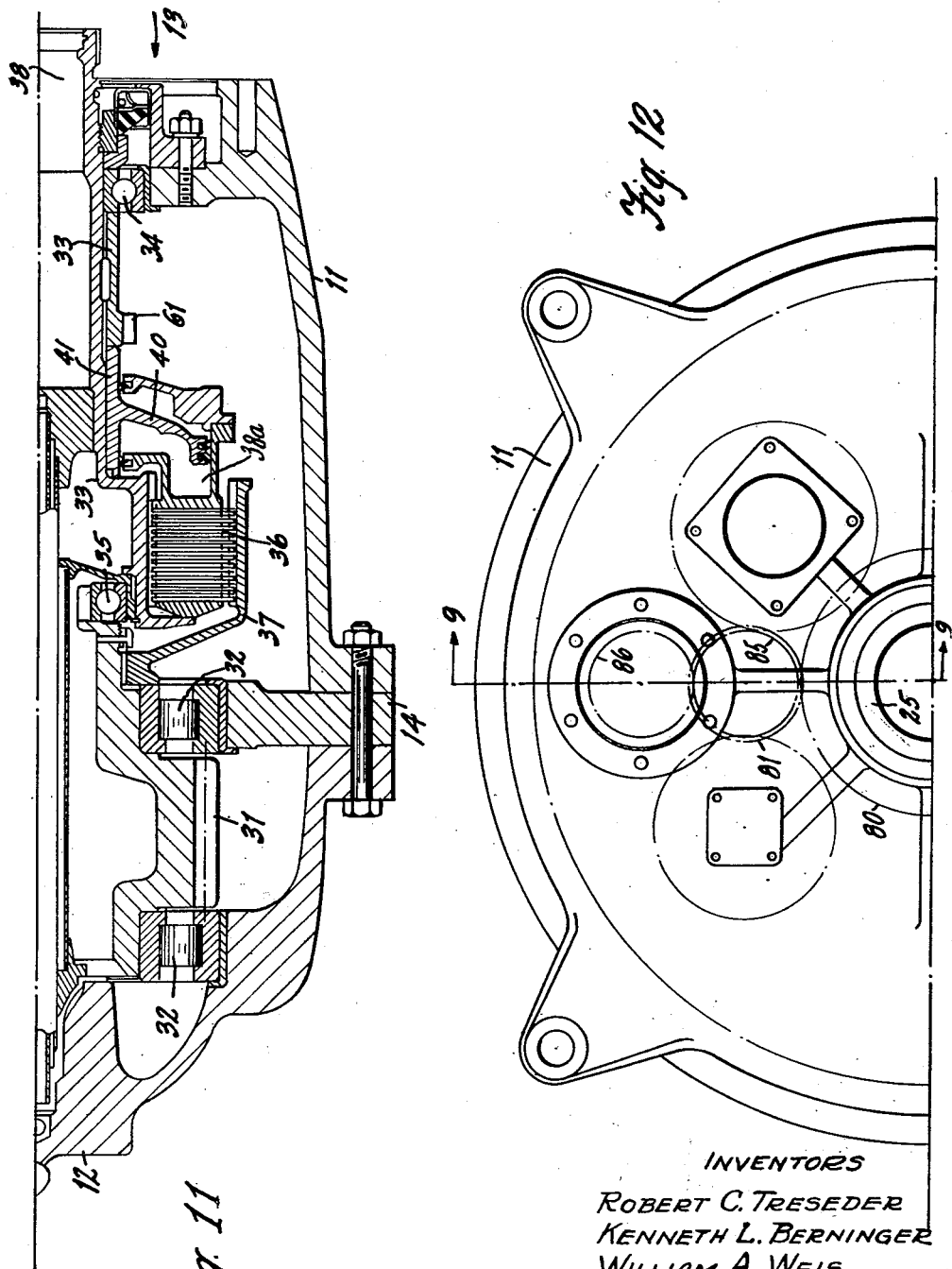

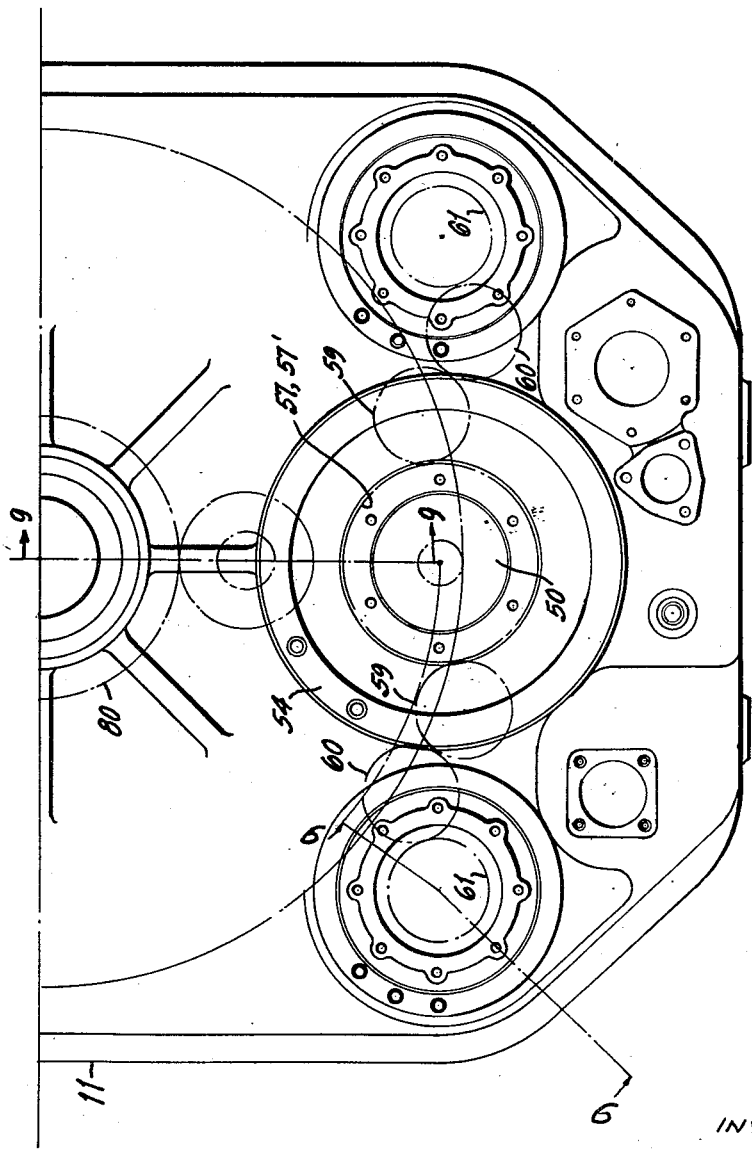

ATTORNEYS

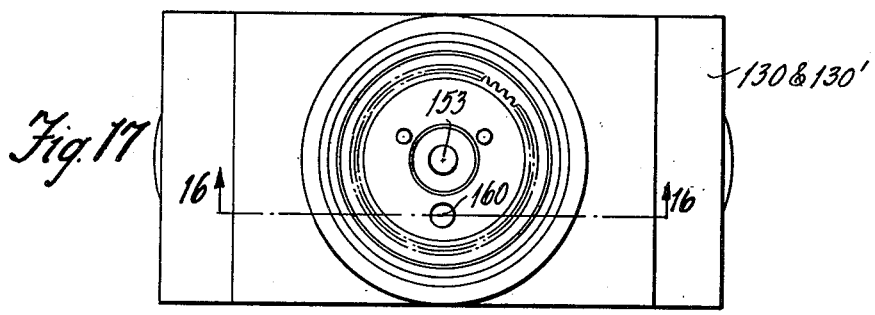
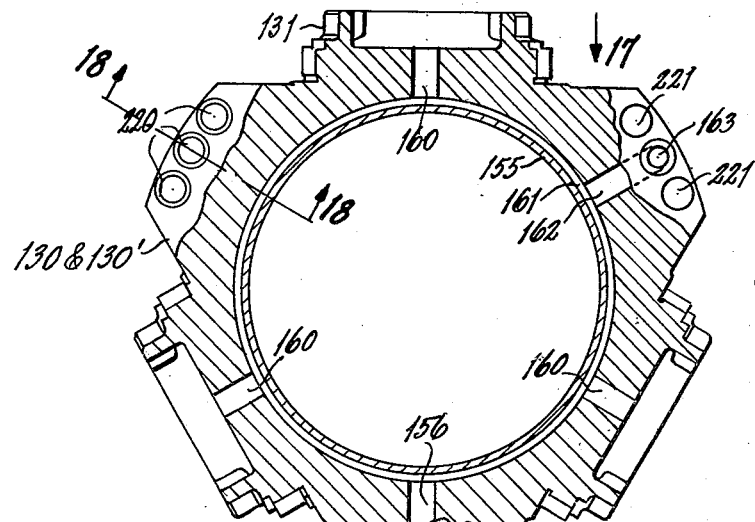
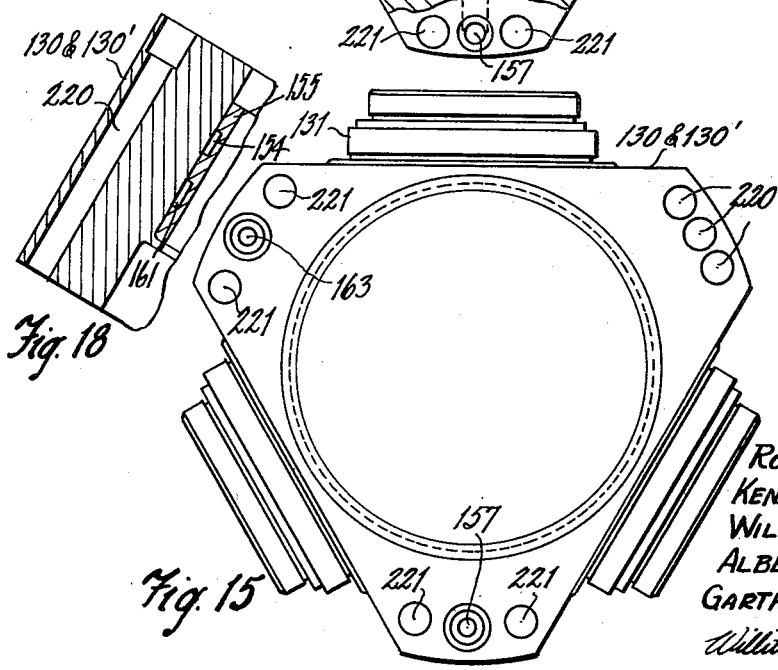

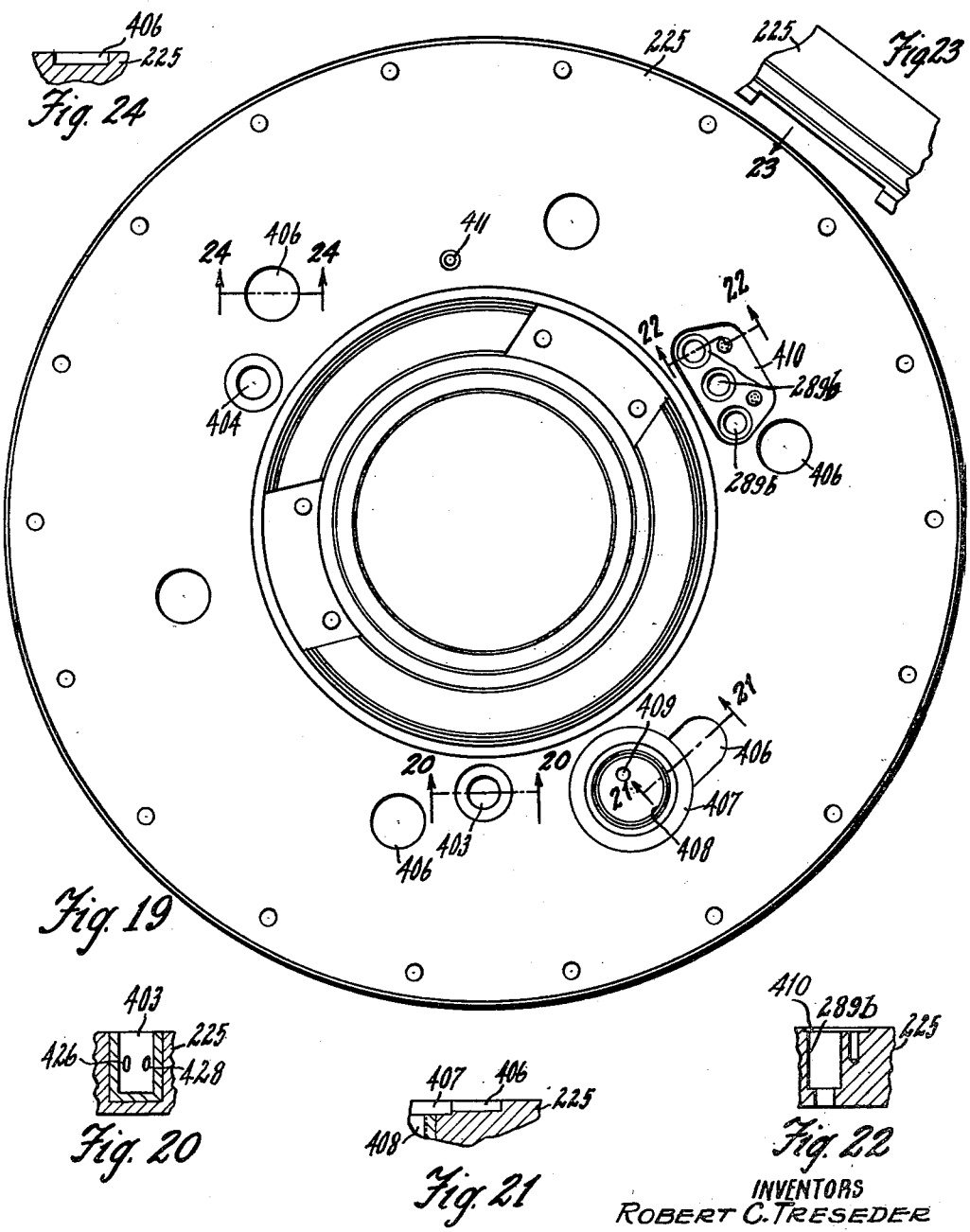

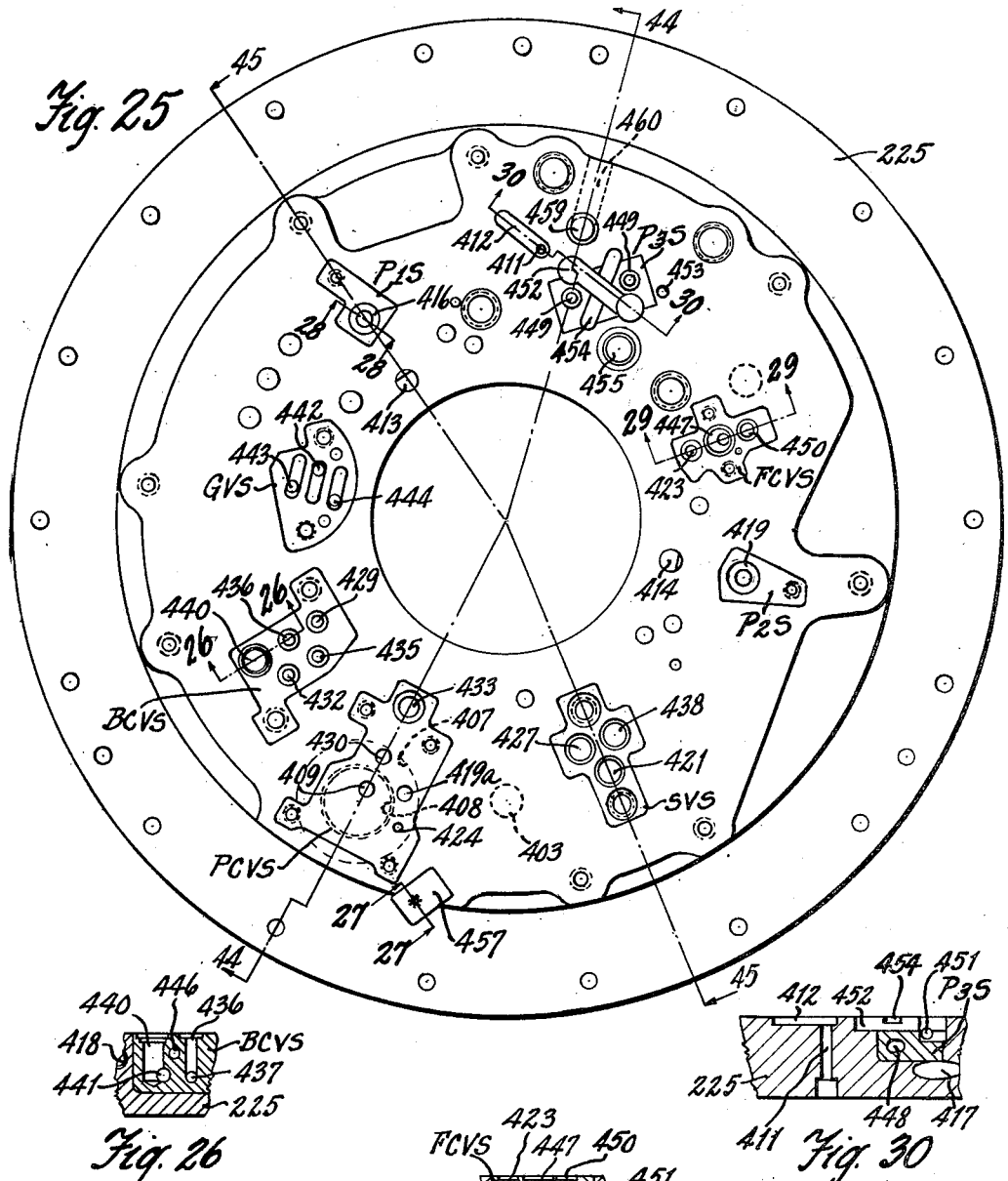

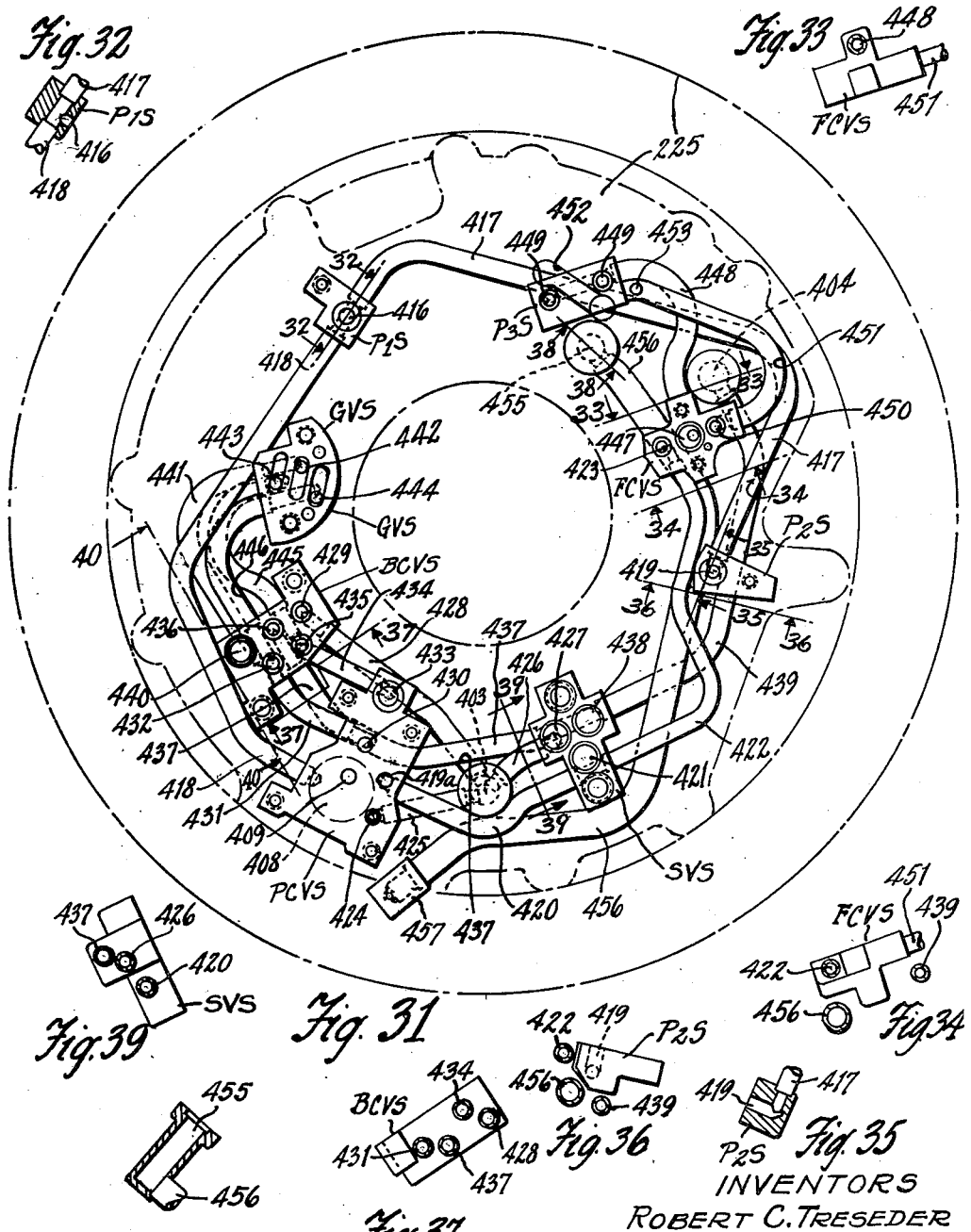

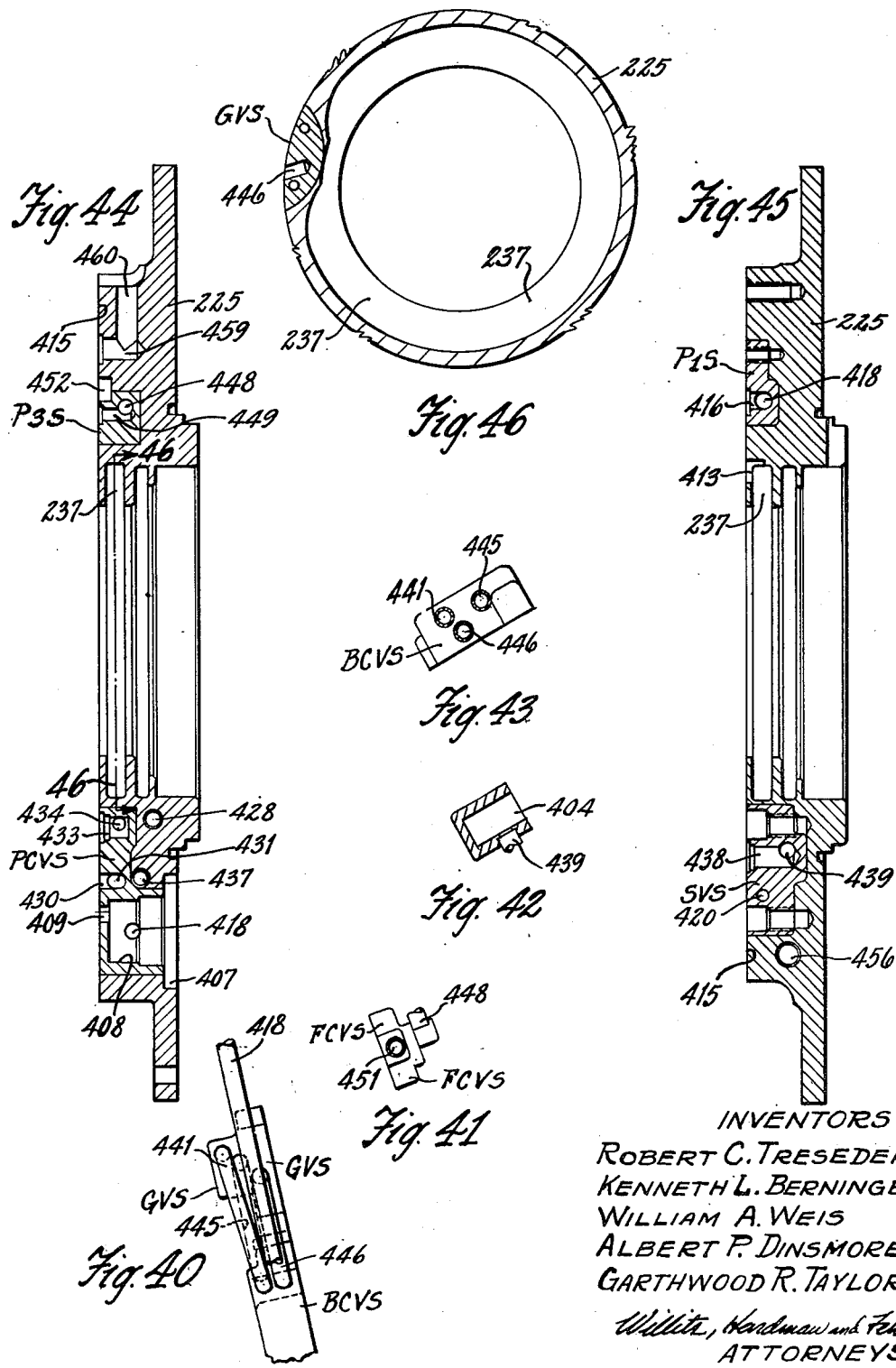

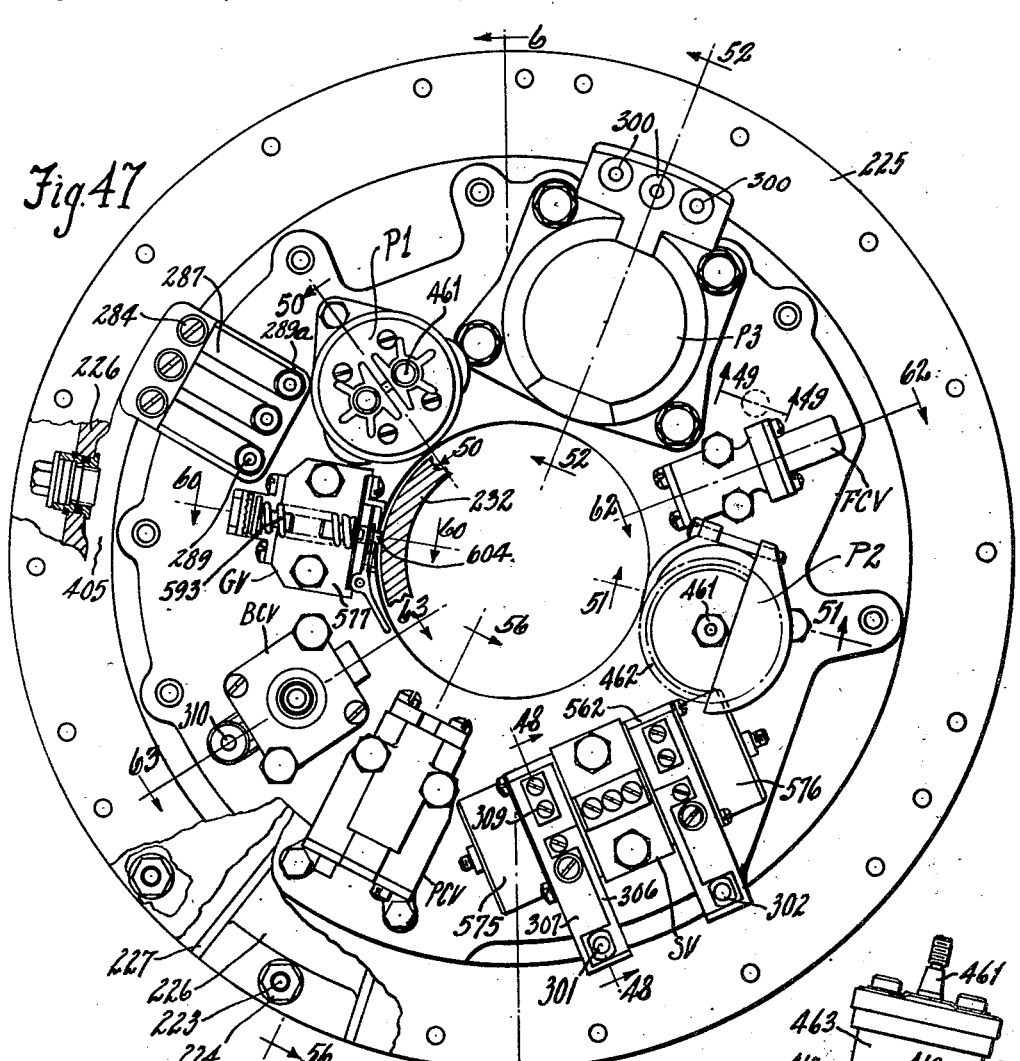
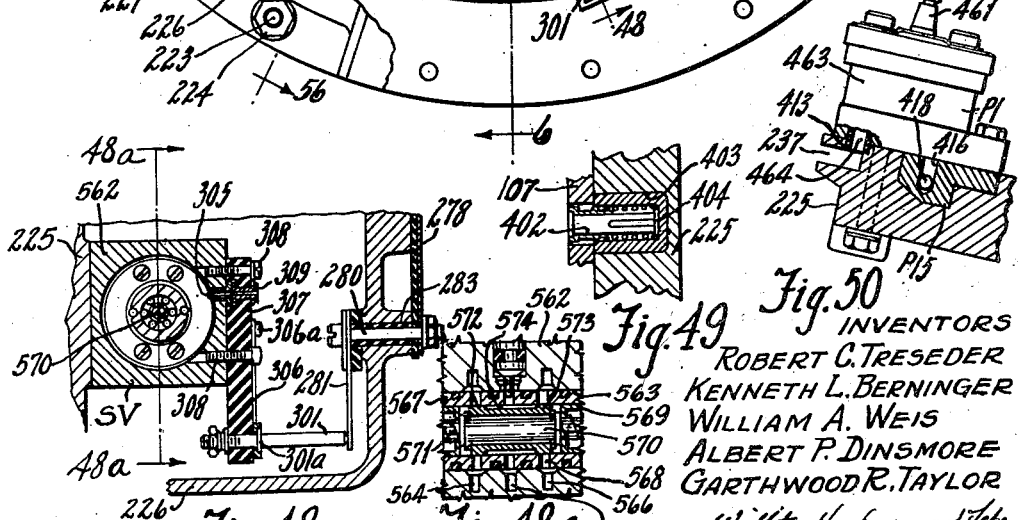

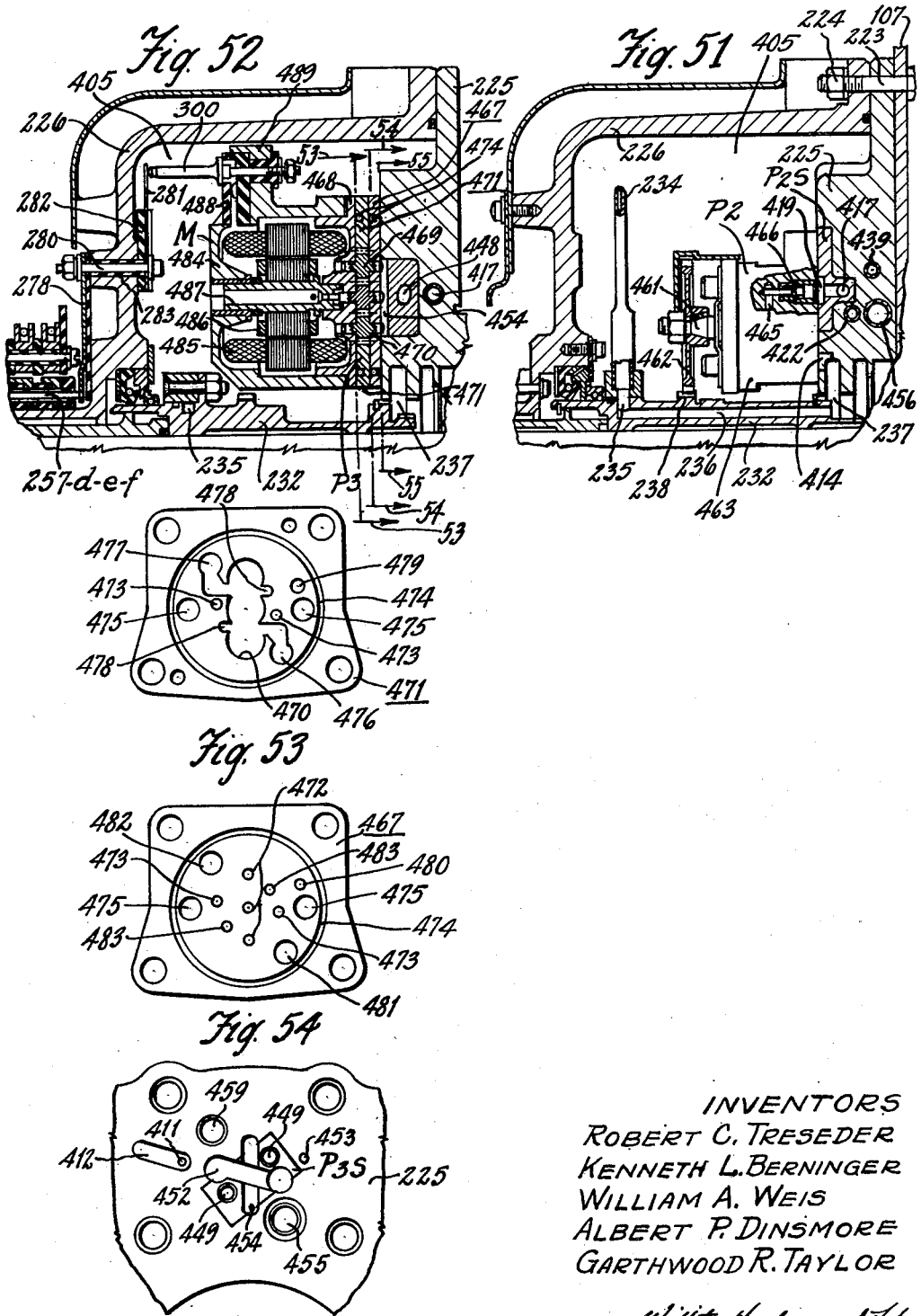

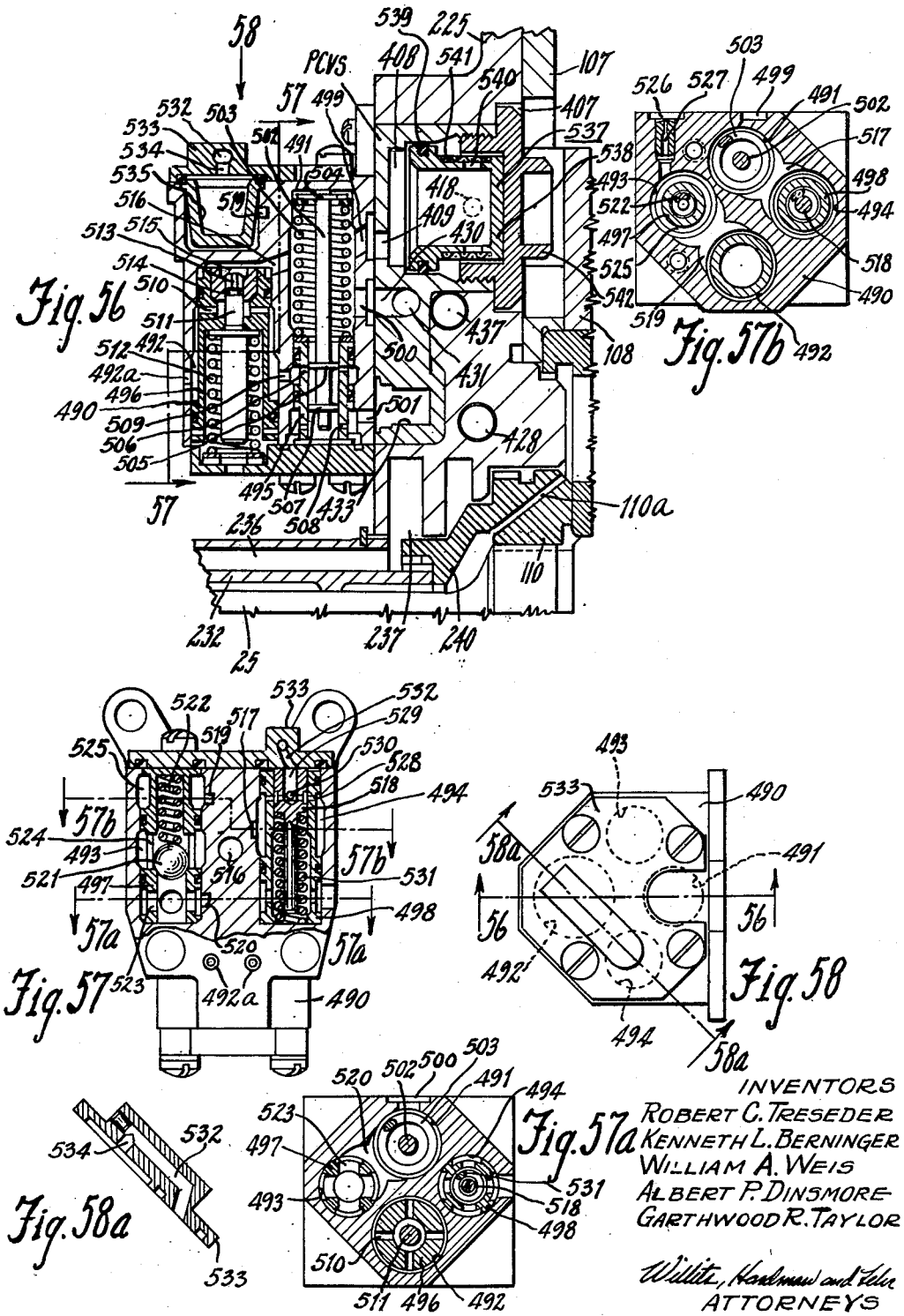

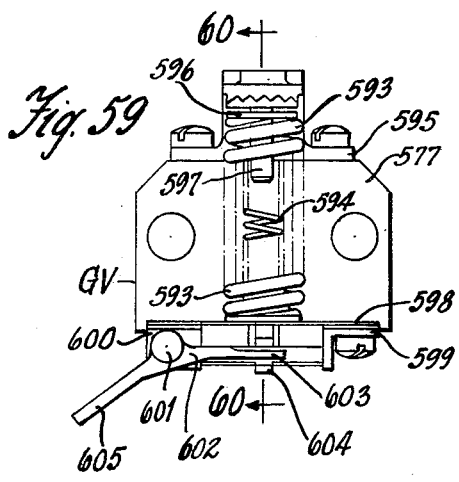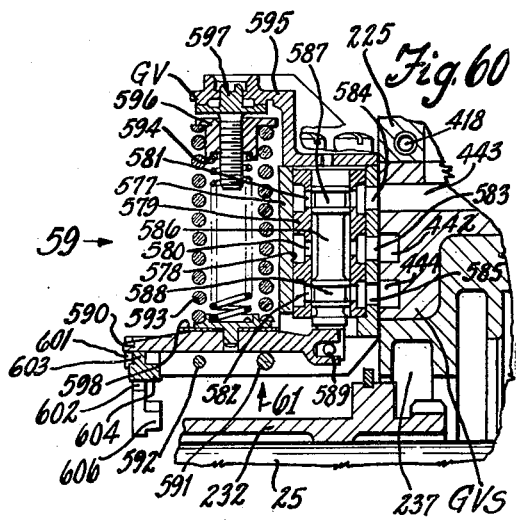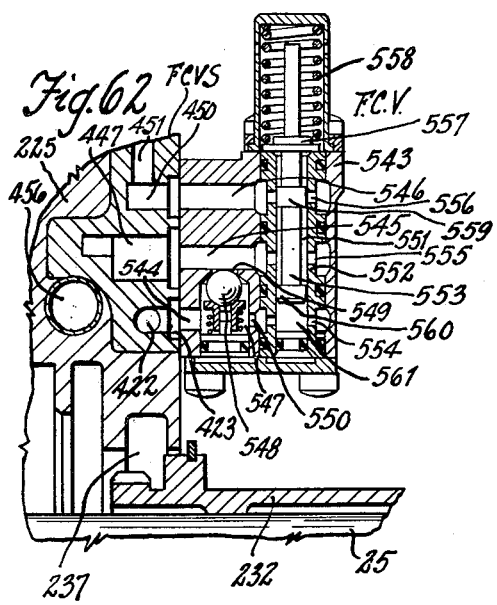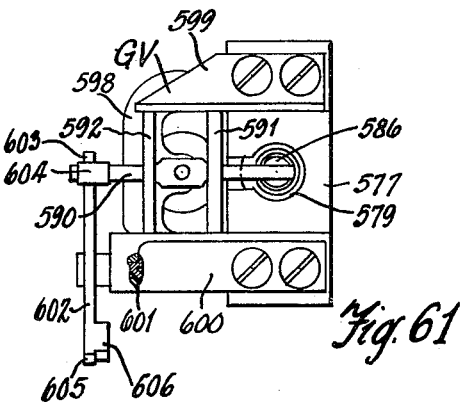
INVENTORS
ROBERT C. TRESEDER
KENNETH L. BERNINGER
WILLIAM A. WEIS
ALBERT P. DINSMORE
GARTHWOOD R. TAYLOR
ATTORNEYS

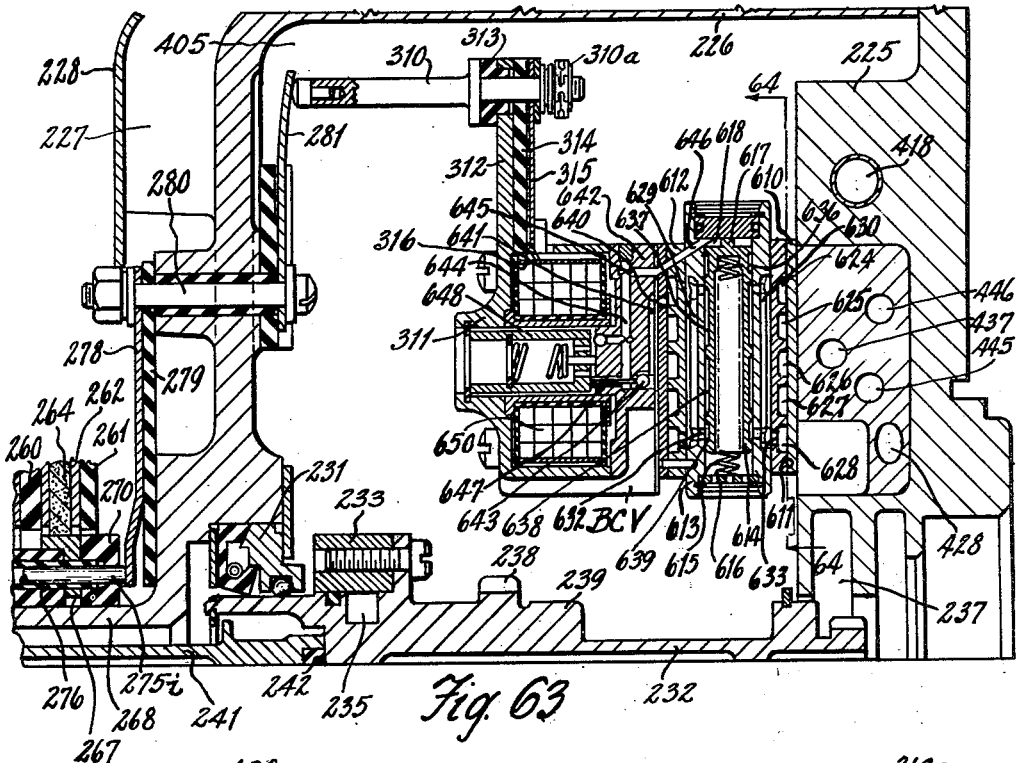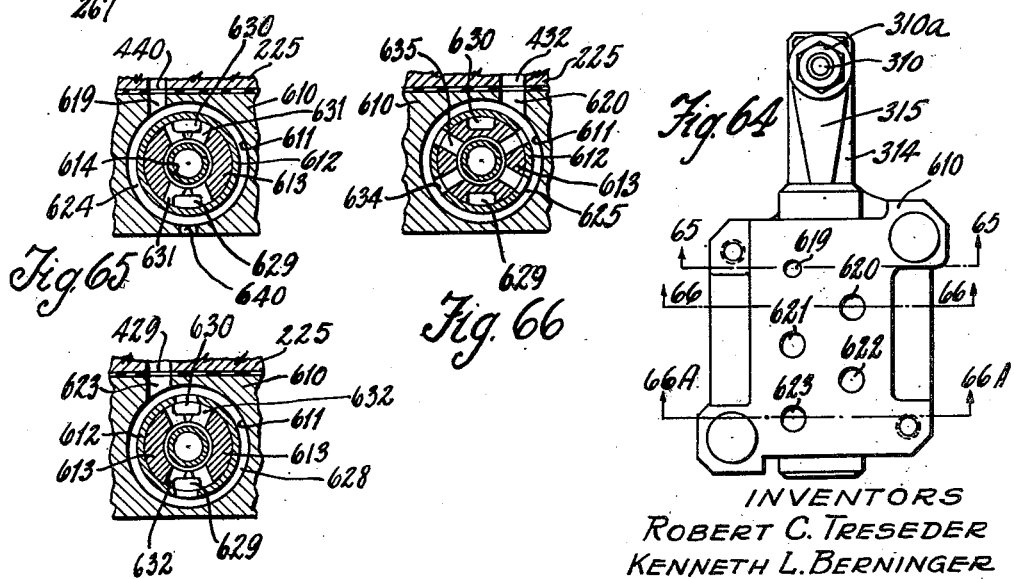

Aug. 27, 1957     R. C. TRESEDER ET AL     2,804,154
CONCURRENT BLADE PITCH CONTROL OF COAXIAL PROPELLERS
Filed Feb. 19, 1952     27 Sheets-Sheet 24

INVENTORS
ROBERT C. TRESEDER
KENNETH L. BERNINGER
WILLIAM A. WEIS
ALBERT P. DINSMORE
GARTHWOOD R. TAYLOR

ATTORNEYS

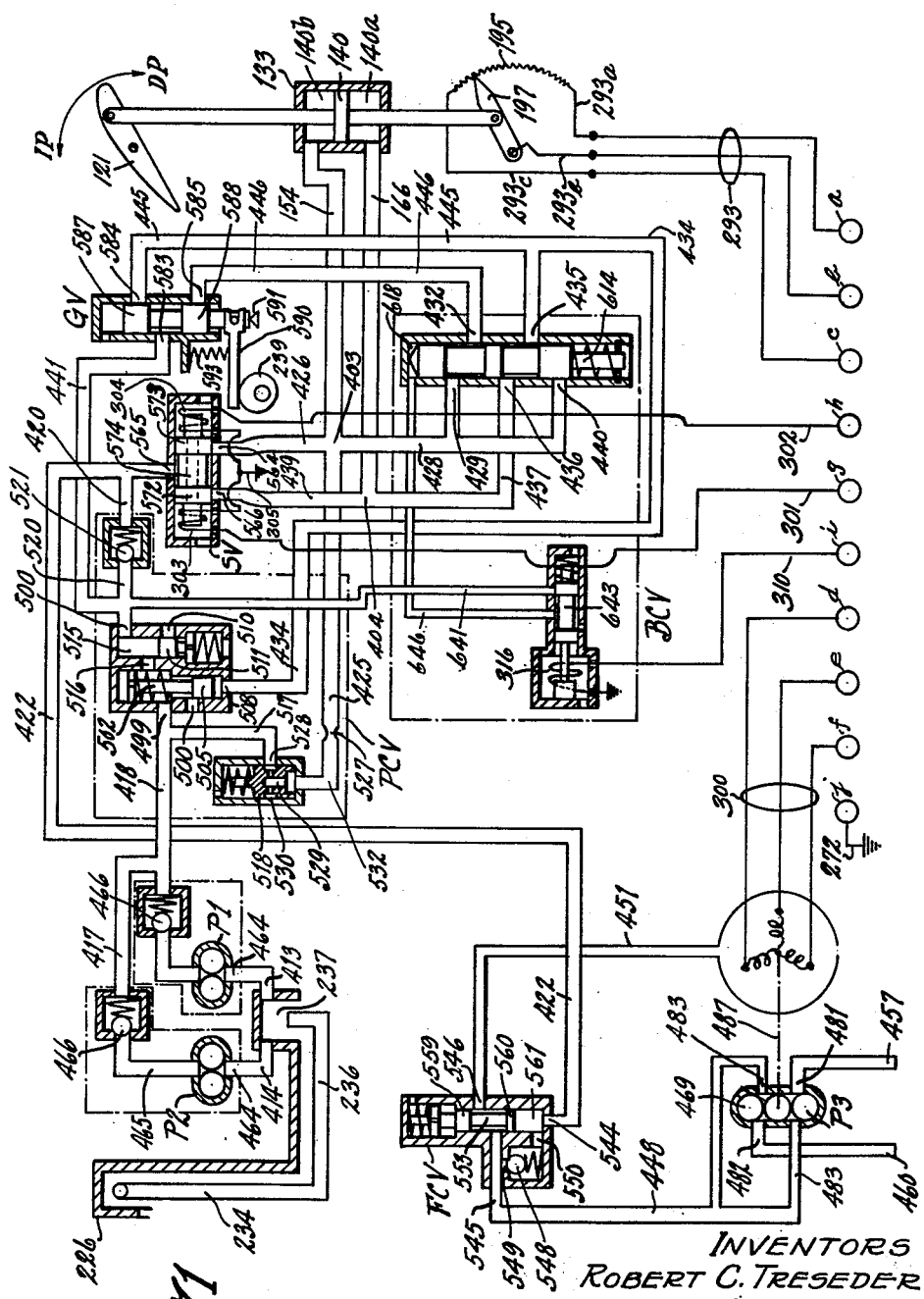

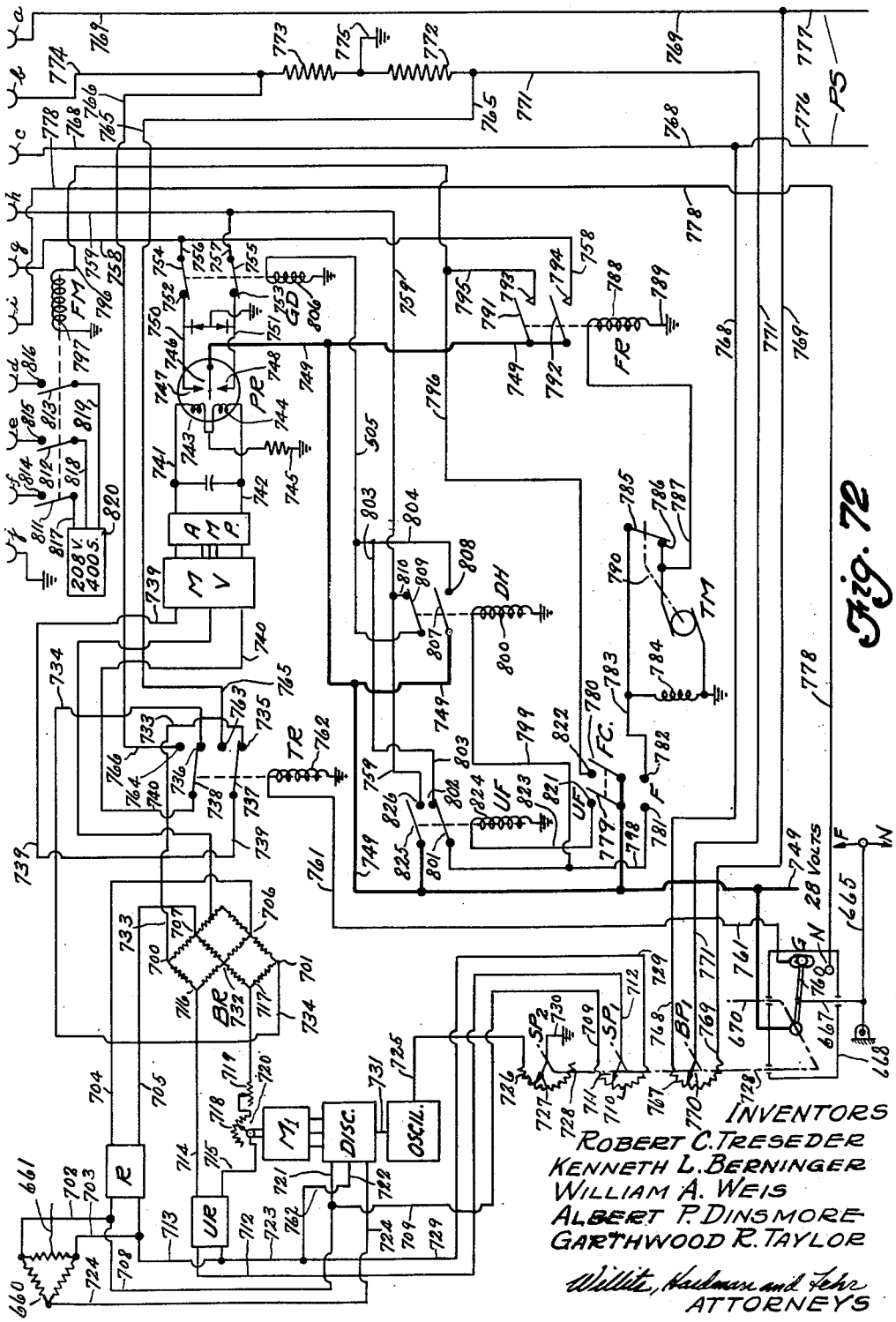

United States Patent Office 2,804,154
Patented Aug. 27, 1957

2,804,154

CONCURRENT BLADE PITCH CONTROL OF COAXIAL PROPELLERS

Robert C. Treseder, Kenneth L. Berninger, William A. Weis, Albert P. Dinsmore, and Garthwood R. Taylor, Dayton, Ohio, assignors to General Motors Corporation, Detroit, Mich., a corporation of Delaware Application February 19, 1952, Serial No. 272,398

41 Claims. (Cl. 170—135.27)

This invention relates to aircraft power plants and particularly to a plant comprising one or more internal combustion turbines and a propeller driven thereby. The present invention is concerned with the support for and the construction of a propeller adapted to be rotated at such relatively high speed that blade tip exceeds sound speed, hence the propeller is termed "supersonic."

Objects of the invention include provision for the support of the propeller in a manner such that a fixed load is applied to the propeller supporting member, provision for the support of a radar in front of the aircraft and provision for housing of wiring for connecting apparatus in the airplane with the radar, and the regulator which controls blade pitch. To accomplish these and other objects of the invention, the disclosed embodiment of the invention includes a gear housing which is attached to the housing of the engine or engines, thereby forming a structural unit which can be inserted into a power-plant housing or nacelle provided by the airplane. The gear housing encloses gears by which the engine or engines are connected with the propeller and other gears by which accessories are given. The gear housing supports a fixed, tubular shaft which extends forwardly and supports the propeller. The propeller may have a single hub supporting blades or there may be a plurality of hubs each supporting blades. The hub or hubs are journalled on bearings supported by the fixed shaft. The fixed shaft supports a fixed spinner nose in which a radar screen may be located. The fixed shaft, being tubular, houses wires for making connections with the radar and electrical devices of the regulator such as a solenoid valve for controlling blade pitch, an electric motor which drives a pump for supplying pressure fluid for feathering and unfeathering, and such other electrical controls as may be needed. The regulator housing which rotates with the propeller is located forward thereof.

A further object is to provide for facile removal of the propeller assembly from the fixed shaft or removal of the fixed shaft from the gear housing with the propeller assembly remaining on the fixed shaft.

A further object is to provide for support by the propeller of a rotary spinner portion which surrounds the root portion of the propeller blades and which provides openings through which the blades extend, said openings being substantially closed by cuffs attached to the blades, said cuffs having exterior surfaces of such contour that, when the blades are at optimum operating angle, the cuffs provide for complete non-interruption of the streamlining effect of the rotary spinner portion.

Further objects and advantages of the present invention will be apparent from the following description, reference being had to the accompanying drawings wherein a preferred embodiment of the present invention is clearly shown.

In the drawings:

Fig. 1A is a block diagram of the control system for the turbine-propeller combination of Fig. 1.

Figure 2:
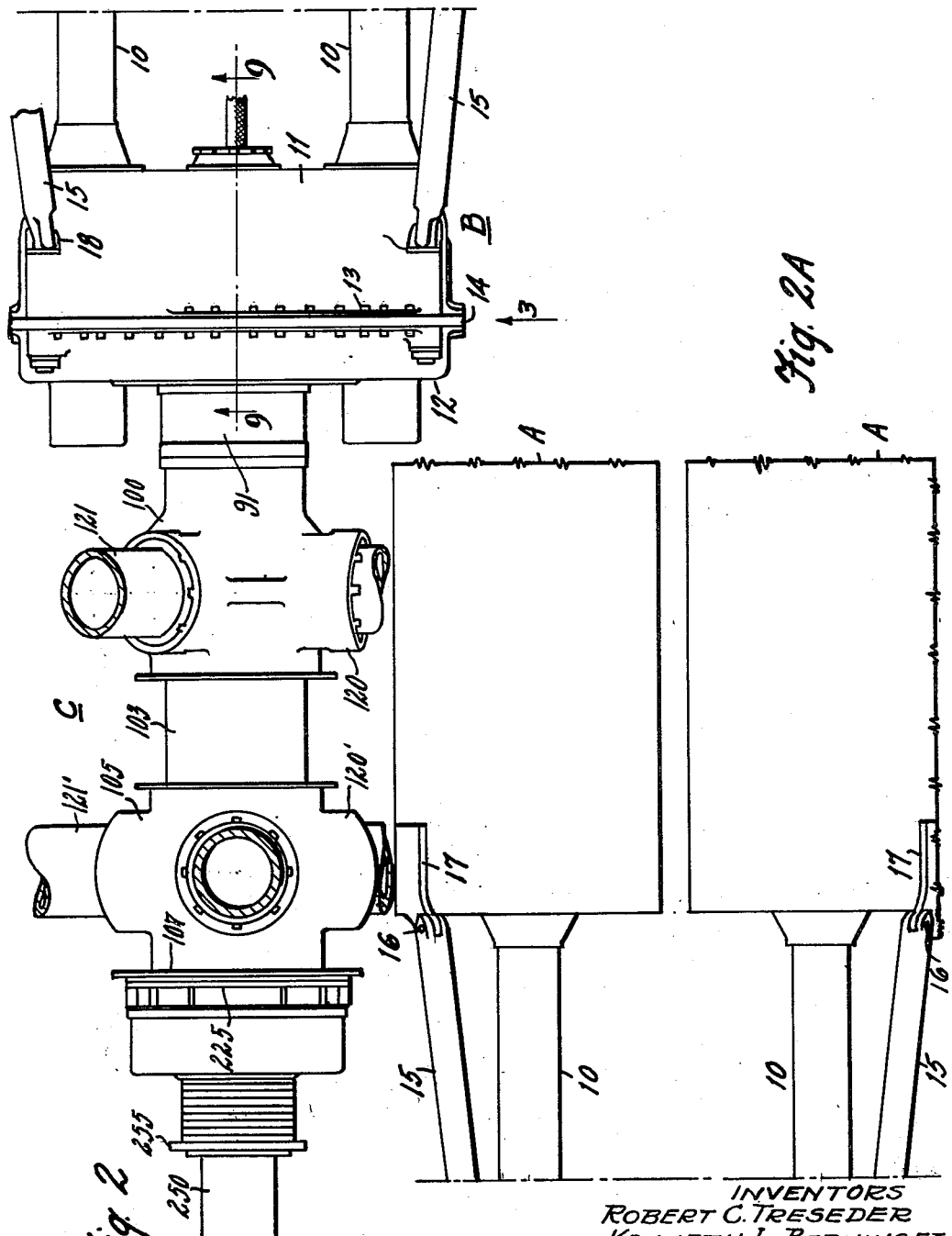

Figs. 2 and 2A together comprise a plan view, somewhat diagrammatic of the power plant which includes the present invention.

Figure 3:
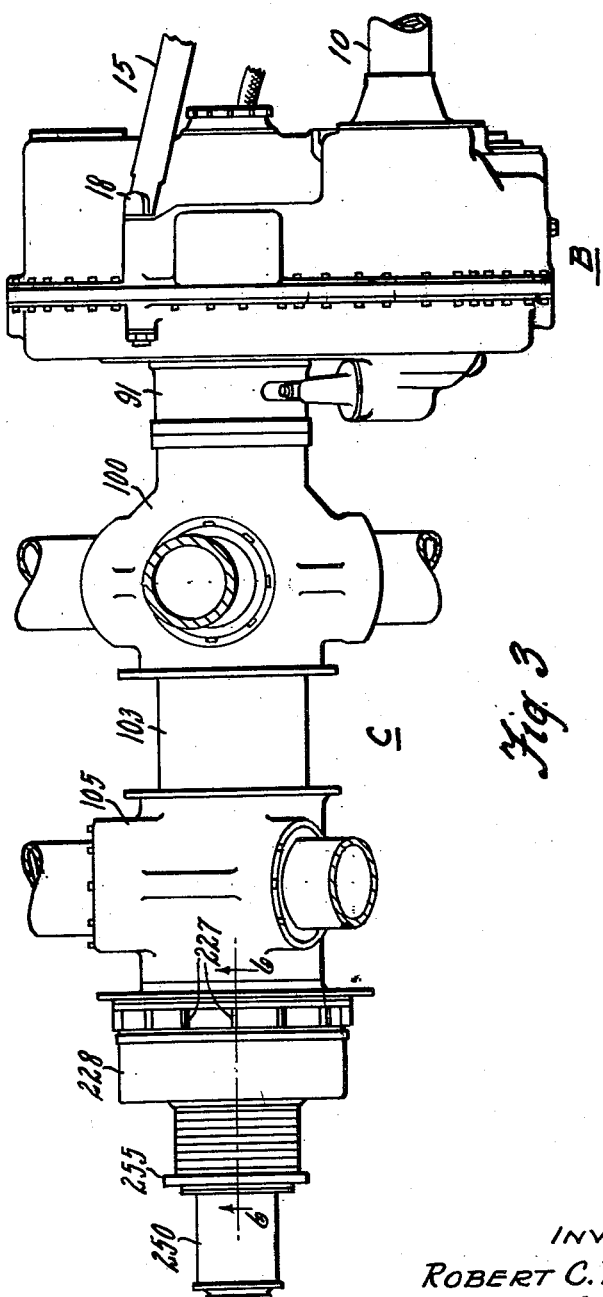

Fig. 3 is a view in the direction of arrow 3 of Fig. 2.

Figure 4:
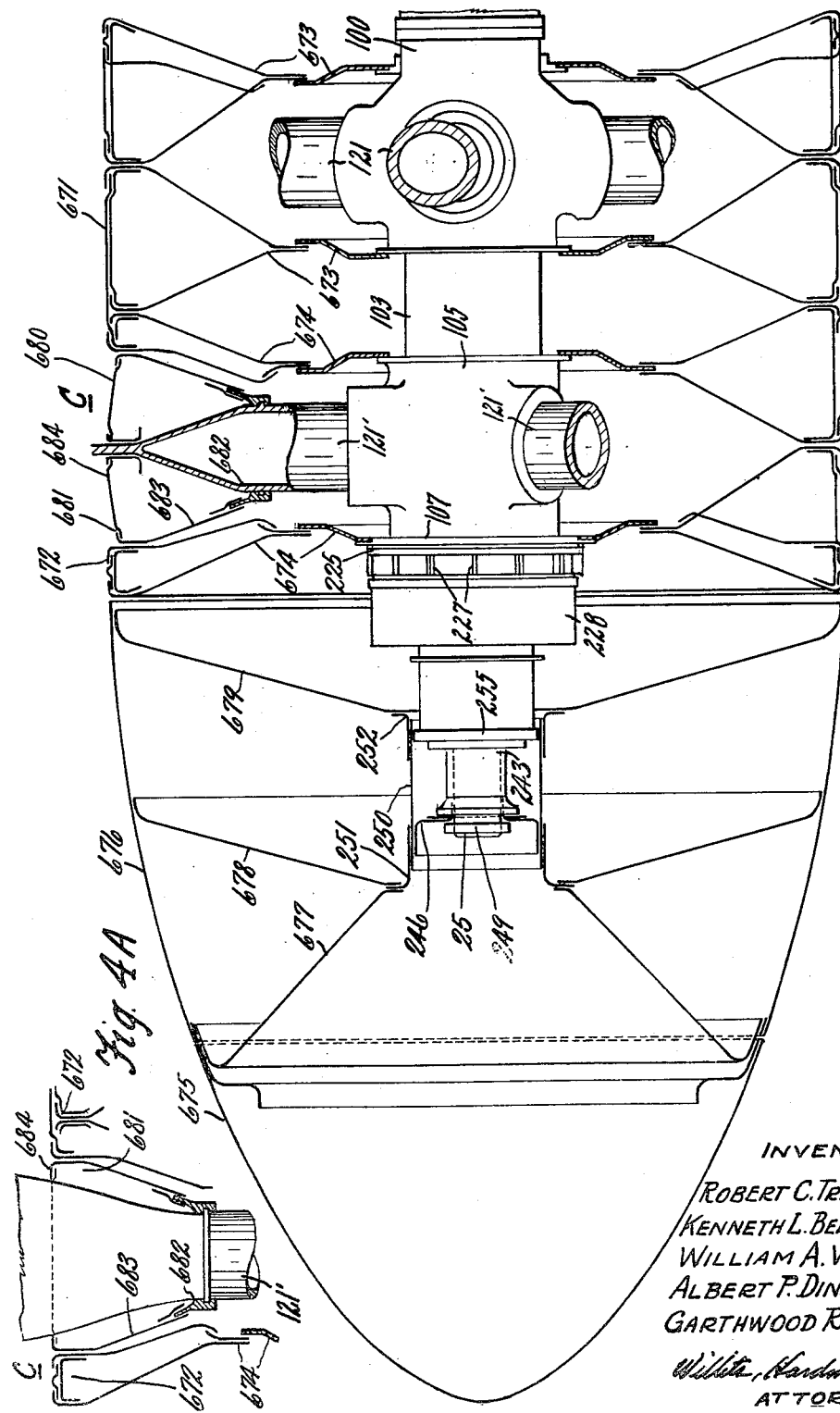

Fig. 4 is a view of the propeller showing in longitudinal section, the spinner.

Fig. 4A is a fragment of Fig. 4 showing a blade in a different angular position.

Figs. 5 to 8 inclusive are enlargements of fragments of longitudinal section views of the propeller.

Figure 5:
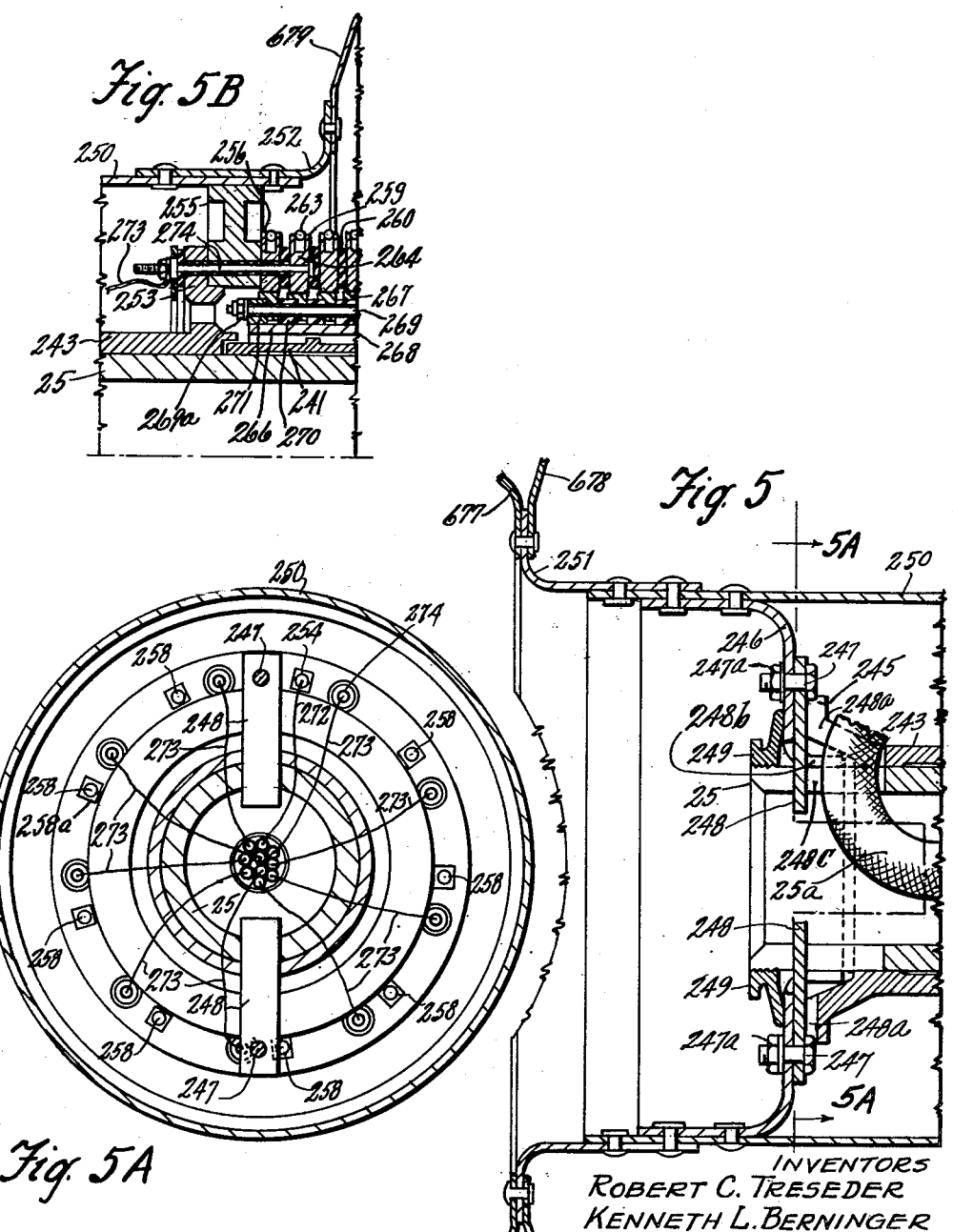

Fig. 5A is a sectional view on line 5A—5A of Fig. 5.

Fig. 5B is a fragmentary sectional view showing the extension of tube 250 (Fig. 5) and parts supported thereby.

Figure 6:
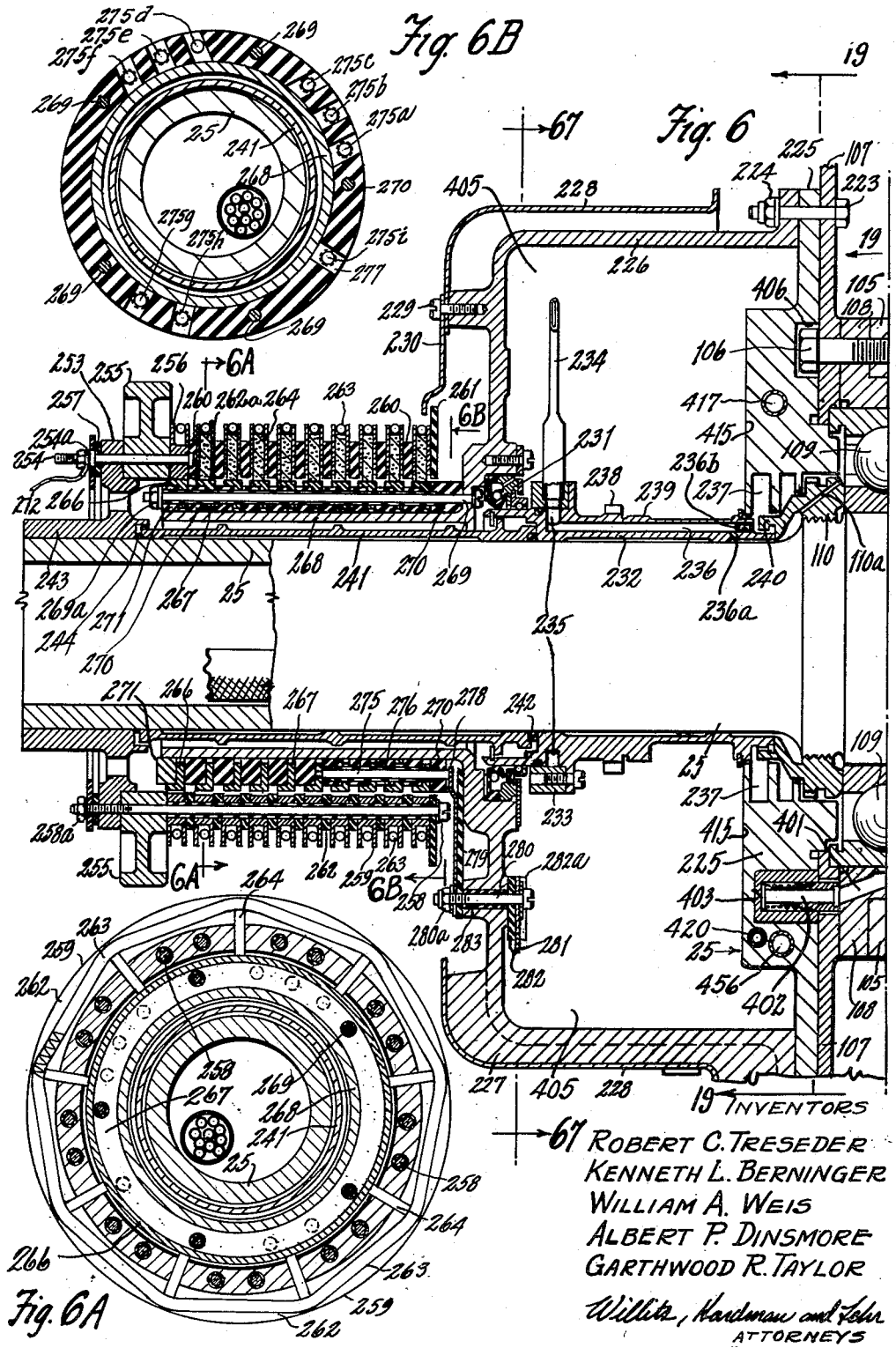

Fig. 6 is a sectional view through regulator and slipring assembly as indicated by the line and arrows 6—6 of Fig. 3.

Figs. 6A and 6B are sectional views respectively on lines 6A—6A and 6B—6B of Fig. 6.

Figure 7:
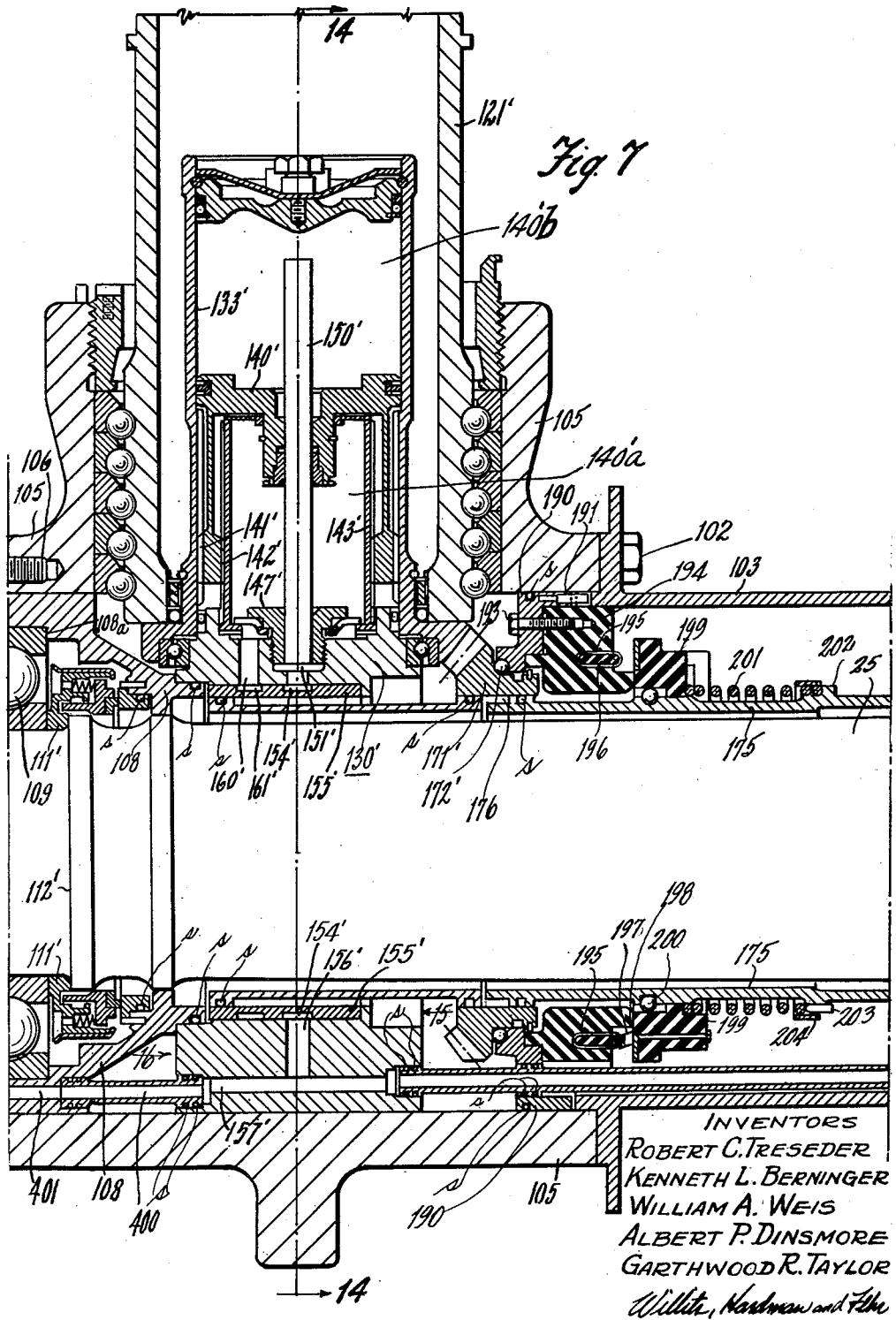
Figure 8:
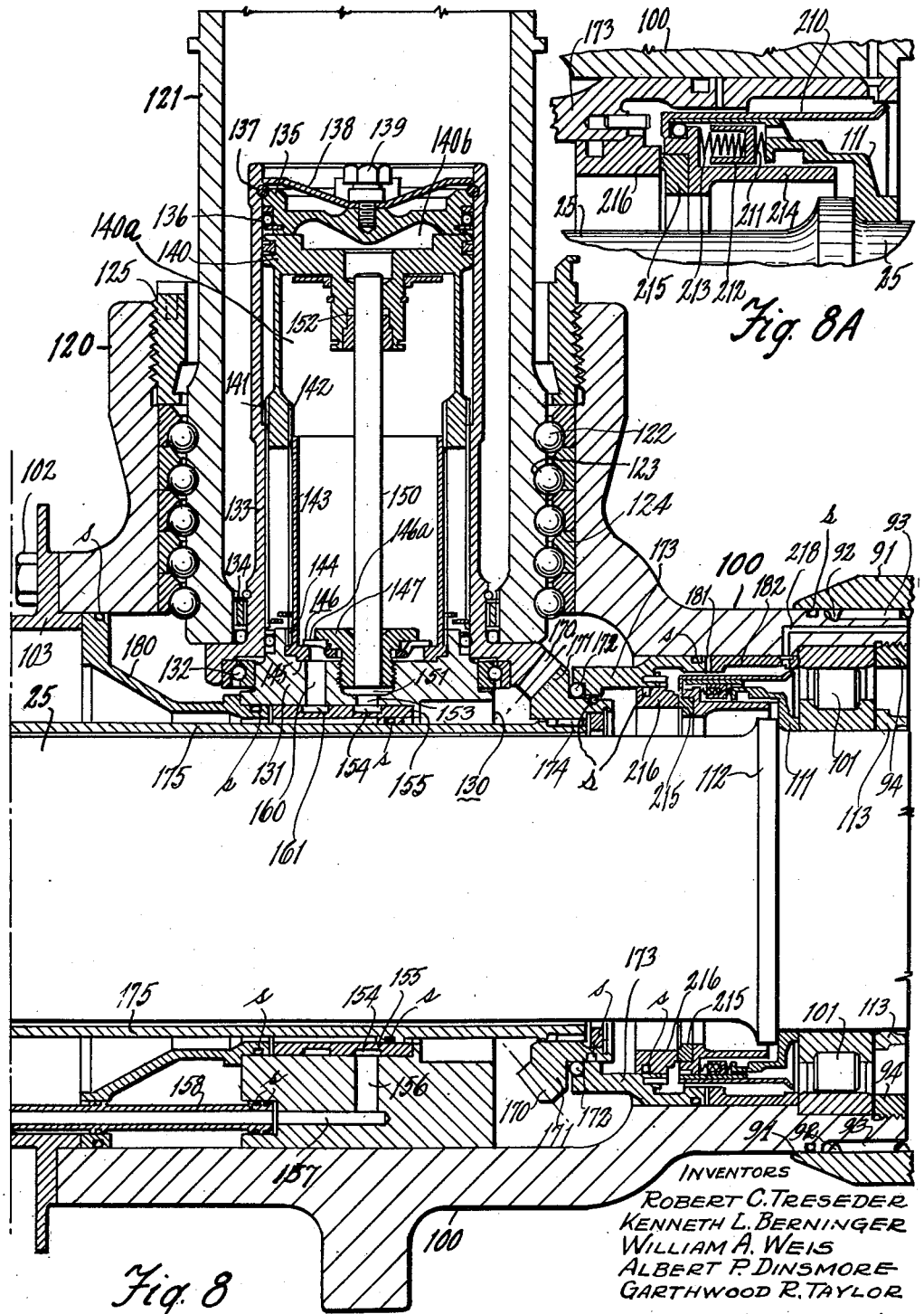

Figs. 7 and 8, taken together makes for a longitudinal section of a propeller of the two stage type, Fig. 7 being of the forward component, and Fig. 8 being the rearward component.

Fig. 8A is an enlargement of a portion of Fig. 8.

Figs. 9, 9A, 10 and 11 together constitute a sectional view on lines 9—9 of Figs. 2, 12 and 13.

Figure 9:
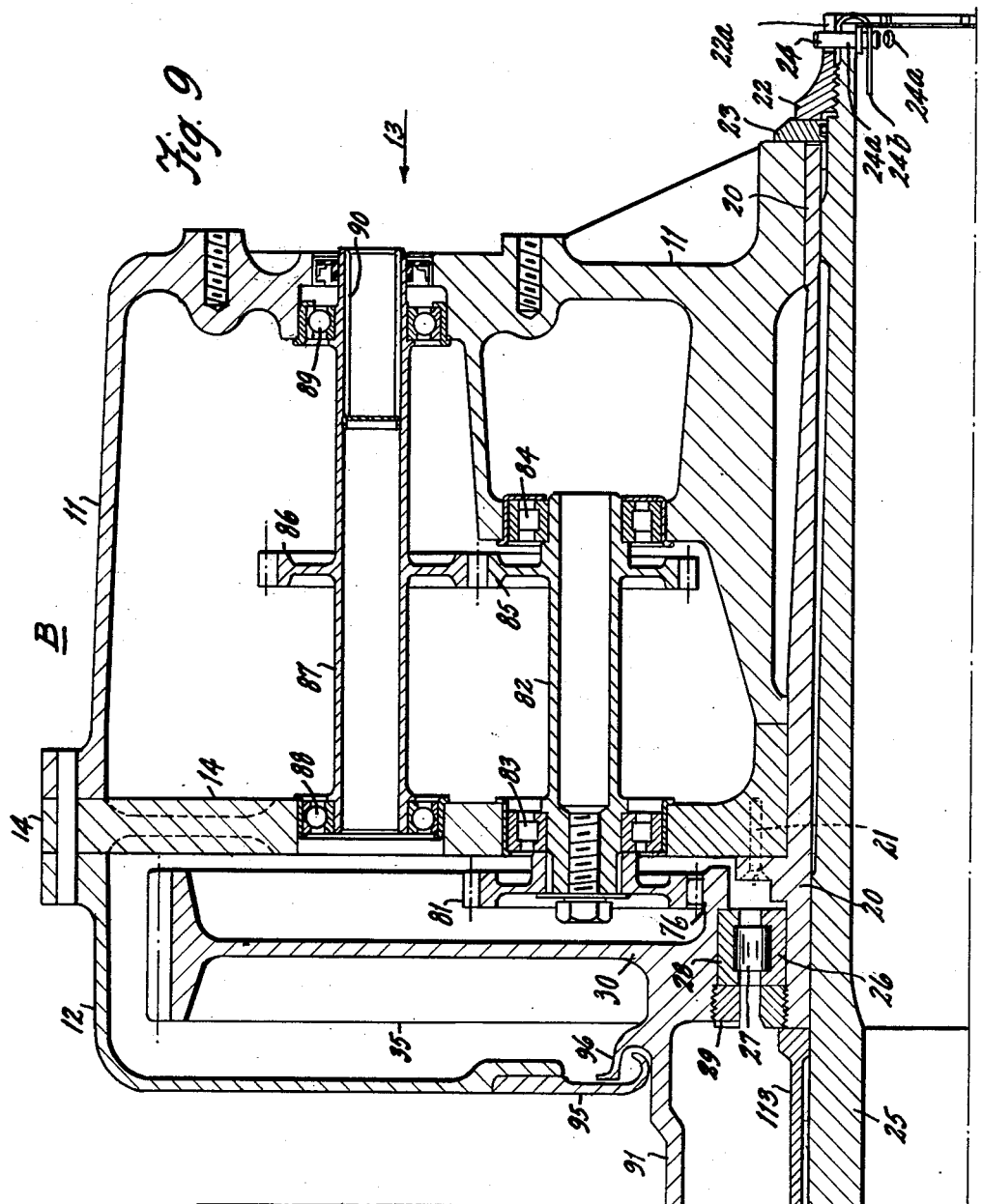
Figure 10:
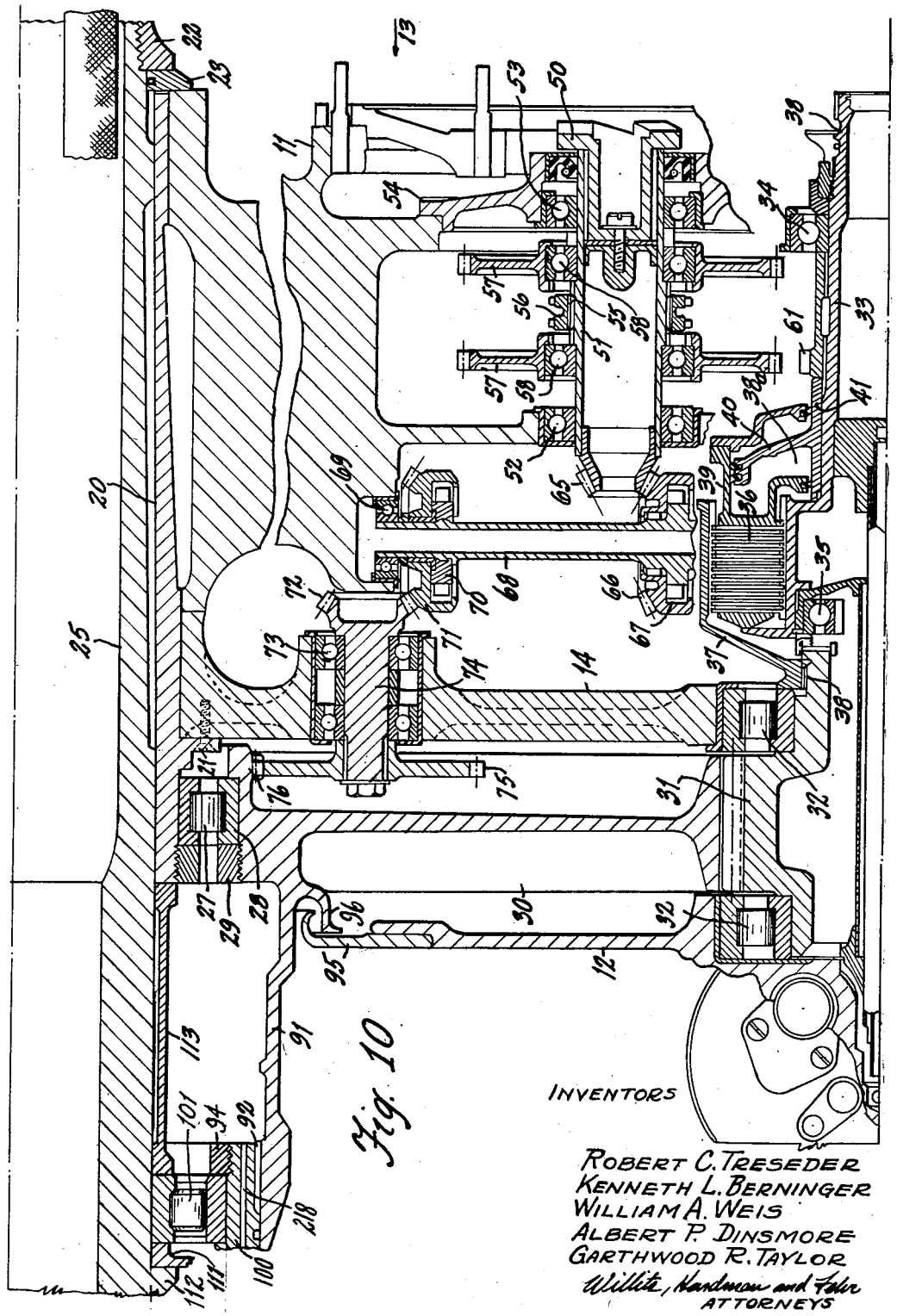

Figs. 12 and 13 together form an end view of the gear housing looking forward in the direction of arrow 13 of each of Figs. 9, 10 and 11.

Figure 14:
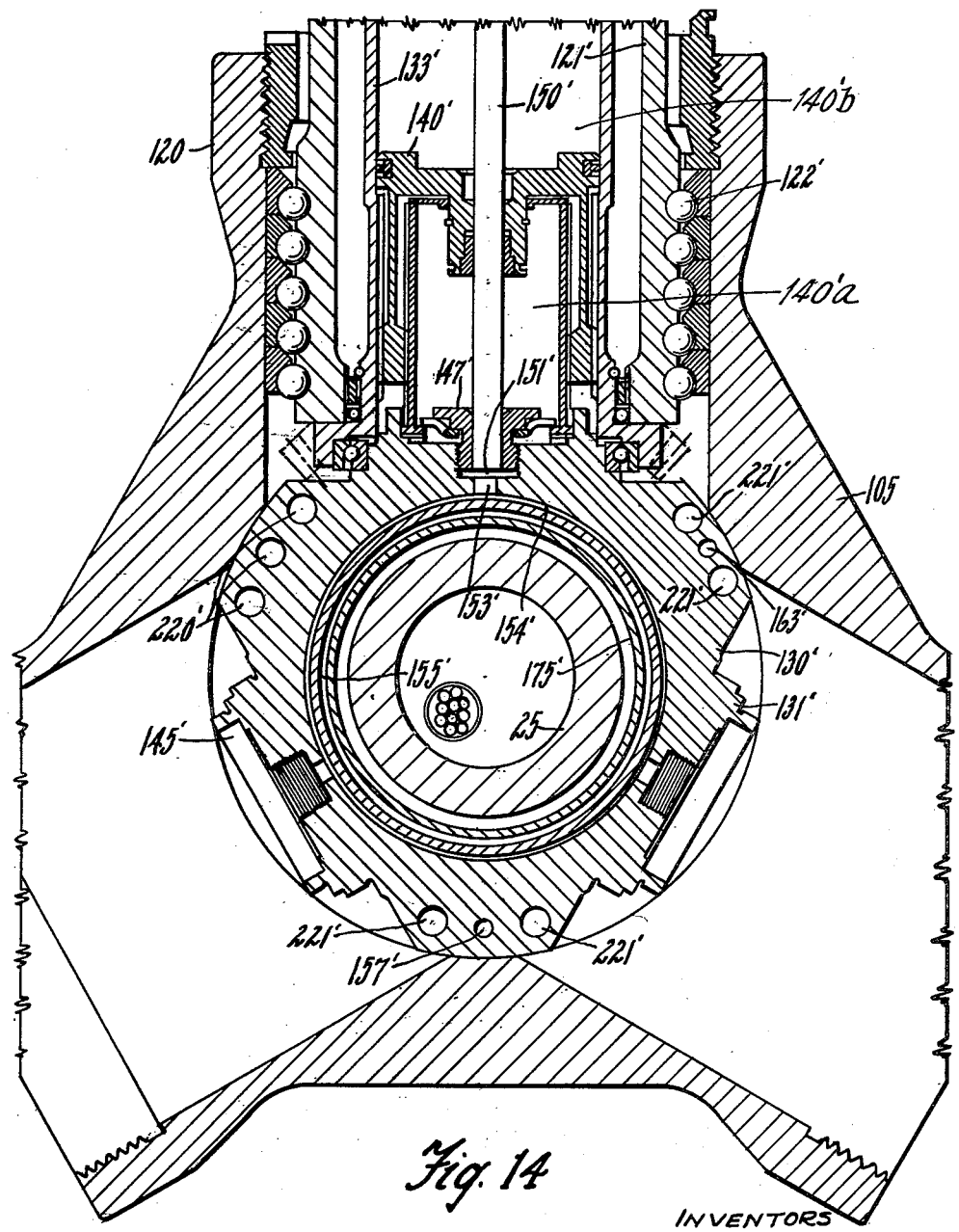

Fig. 14 is a transverse sectional view on line 14—14 of Fig. 7.

Fig. 15 is a view of the island in the direction of arrow 15 of Fig. 17.

Fig. 16 is a view of the island in the direction of arrow 16 of Fig. 7, the part in section being taken on line 16—16 of Fig. 17.

Fig. 17 is a view in the direction of arrow 17 in Fig. 16.

Fig. 18 is a sectional view on line 18—18 of Fig. 16.

Fig. 19 is a view in the direction of arrow 19 of Fig. 6 showing the regulator base.

Figs. 20 through 24 are views, respectively, on lines 20—20, 21—21, 22—22, 23—23, and 24—24 of Fig. 19.

Fig. 25 is a view in the direction of arrow 25 of Fig. 6 showing the regulator plate without the instruments mounted thereon.

Figs. 26 through 30 are sectional views, respectively, on lines 26—26, 27—27, 28—28, 29—29 and 30—30 of Fig. 25.

Fig. 31 is a view similar to Fig. 30 showing the ducts connecting the instrument mounting pad shown in Fig. 25.

Figs. 32 through 43 are views, respectively, on lines 32—32, 33—33, 34—34, 35—35, 36—36, 37—37, 38—38, 39—39, 40—40, 41—41, 42—42 and 43—43 of Fig. 31.

Figs. 44 and 45 are sectional views, respectively on lines 44—44 and 45—45 of Fig. 25.

Fig. 46 is a sectional view on line 46—46 of Fig. 44.

Fig. 47 is a view similar to Figs. 25 and 31 and shows the instruments mounted on the regulator base.

Figs. 48 through 52 are sectional views, respectively, on lines 48—48, 49—49, 50—50, 51—51 and 52—52 of Fig. 47.

Fig. 48a is a sectional view on line 48a—48a of Fig. 48.

Figs. 53, 54 and 55 are sectional views, respectively, on lines 53—53, 54—54 and 55—55 of Fig. 52.

Fig. 56 is an enlarged sectional view on line 56—56 of Fig. 47.

Fig. 57 is a sectional view on line 57—57 of Fig. 56.

Figs. 57a and 57b are sectional views as indicated by arrows 57a—57a and 57b—57b of Fig. 57.

Fig. 58 is a view in the direction of arrow 58 of Fig. 56.

Fig. 58a is a sectional detail indicated by arrow 58a in Fig. 58.

Fig. 59 is an enlarged side view of the governor valve shown in Fig. 47.

Fig. 60 is a sectional view on line 60—60 of Figs. 47 and 59.

Fig. 61 is a view in the direction of arrow 61 of Fig. 60.

Fig. 62 is a sectional view on line 62—62 of Fig. 47.

Fig. 63 is an enlarged sectional view on line 63—63 of Fig. 47.

Fig. 64 is a view in the direction of arrow 64 of Fig. 63, showing the ports in the bottom of the selector valve.

Figs. 65, 66 and 66a are sectional views, respectively, on lines 65—65, 66—66 and 66a—66a of Fig. 64.

Fig. 67 is a sectional view on line 67—67 of Fig. 6.

Figs. 68 and 69 together constitute a fragmentary, sectional view on line 68—68 of Fig. 67.

Figure 70:
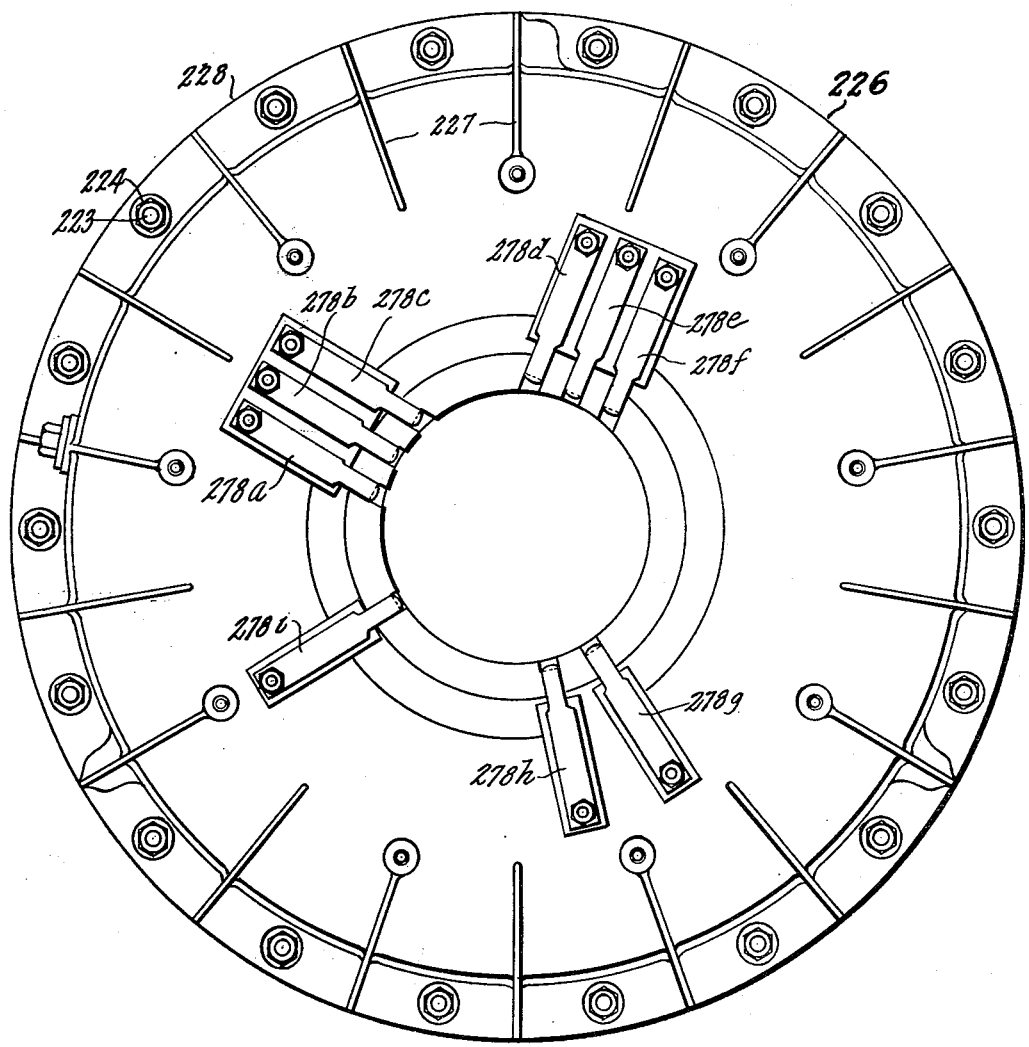

Fig. 70 is a view in the direction of arrow 70 of Fig. 6, showing the front view of the regulator cover.

Fig. 71 is a diagram of hydraulic and electrical circuits of the propeller.

Fig. 72 is a diagram of electrical circuits of the controller by which the turbine-propeller combination operates in a selected regime.

Figure 1:
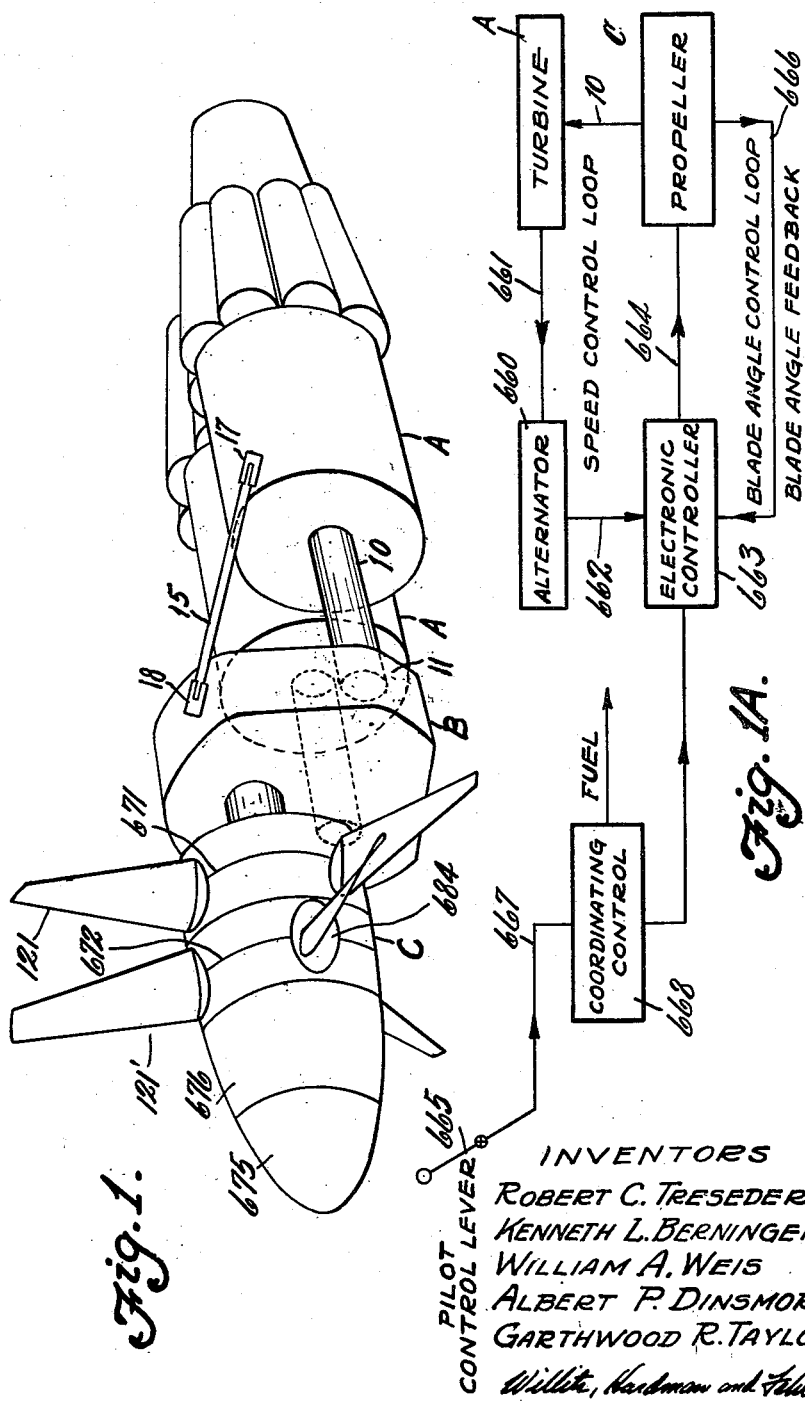
Fig. 1 is a diagrammatic perspective view of a power plant including a propeller and support therefor which embody the present invention.

Referring to Figs. 1 and 2 the power plant comprises chiefly two engines A which may be of internal combustion turbine type, a gear unit B, and a propeller unit C. Shafts which are operated by the engines are enclosed in tubes 10, connected with the frames of the engines and with gear housing member 11 to which housing member 12 is attached by bolts 13 there being a plate 14 between members 11 and 12. The gear housing 11 is connected with the frames of the engines also by bars 15 each attached at one end by a pin 16 to a plate 17 attached to an engine frame and attached at the other end to a clevis 18 attached to housing member 11.

Referring to Figs. 9 and 10, member 11 and plate 14 of magnesium alloy receive a steel bushing or sleeve 20 secured by screws 21 and having a tapered internal bore which receives a fixed shaft 25. The right end of shaft 25 receives a nut 22, the tightening of which pulls the shaft through the bushing 20, a spacer 113, a bearing 101 and ring 111 so that shoulder 112 of one fixed shaft engages ring 111, as a washer 23 is forced against housing 11. Nut 22 is retained in clamping position by a pin 24 received by one of a plurality of holes 24a in the shaft 25 and by one of a plurality of notches 22a in the nut 22. Pin 24 is retained by a wire 24b. Bushing 20 supports the inner race 26 of a roller bearing 27 having an outer race 28 which a nut 29 fixes in the hub of a bull-gear 30.

Referring to Figs. 10 and 11, the gear 30 is connectible with the shaft of each engine in the same manner by means including a gear 31 journaled in bearings 32 supported by housing 12 and plate 14, and located in alignment with a shaft 33 which is connectible with an engine shaft housed within one of the tubes 10 (Fig. 1). Shaft 33 is journaled in a bearing 34 supported by housing 11 (Fig. 11) and in a bearing 35 supported by gear 31. Shaft 33 is connected through the plates 36 of a clutch with a member 37 splinedly connected at 38 with gear 31.

The control of the clutch is effected hydraulically by admission of pressure fluid to an annular chamber 38a between a ring 39 and a flange 40 of a sleeve 41 surrounding shaft 33. These plate clutches are disengageable for the purpose of disconnecting one of the engines from the propeller in order to conserve fuel while cruising.

The connection between an electric starting motor and the power plant is effected by engageable clutch elements one of which is shown at 50 in Fig. 10. Element 50 is connected with a shaft 51 supported by bearings 52 and 53 supported respectively by housing 11 and a cover 54. Shaft 51 has a spline connected at 55 with a slidable clutch member 56 which is engageable either with a gear 57 or a gear 57' journaled on bearings 58 supported by shaft 51. Each of the gears 57, 57' is connected by meshing gears 59, 60 (Fig. 13) with a gear 61. As shown in Fig. 10, each gear 61 is supported by a shaft 33 and is splined thereto.

Shaft 51 is connected by bevel gear 65 with a bevel gear 66 connected by a one-way, overrunning clutch 67 with a shaft 68 journalled in bearings one of which is at 69. Shaft 68 drives a pump for supplying pressure fluid for control of the clutch plates 36 during engine starting. Shaft 68 is driven also by gear 30, when the clutch plates 36 are engaged. This drive includes a one-way, overrunning clutch 70 connecting shaft 68 with a bevel gear 71 meshing with a bevel gear 72 provided by a shaft 74 journalled in bearings 73 supported by plate 14, and connected with a gear 75 meshing with a gear 76 provided by gear 30.

The gear 76 also meshes with a gear 81 attached to a shaft 82 journalled in bearings 83 and 84 supported respectively by plate 14 and housing 11 as shown in Fig. 9. Shaft 82 provides a gear 85 meshing with a gear 86 provided by a shaft 87 journalled in bearings 88 and 89 supported respectively by plate 14 and housing 11. Shaft 87 is formed with splines 90 for making connection with an accessory attachable to the housing 11.

Gear 30 is formed with a sleeve 91 (Figs. 9, 9A and 10) having internal splines 92 engaging external splines 93 (Fig. 8) of a rear propeller hub 100 journalled on a roller bearing 101 supported by fixed shaft 25 and retained by a nut 94. Housing 12 (Fig. 9) supports an oil catcher ring 95 cooperating with an oil-slinger flange 96 of the gear sleeve 91.

Hub 100 is connected by screws 102 with a coupling tube 103 similarly attached as shown in Fig. 7 to a hub 105 to which screws 106 (Fig. 6) attach a plate 107 and a sleeve 108 supported by a ball bearing 109 supported by shaft 25. Plate 107 holds the outer race of bearing 109 against a shoulder 108a of sleeve 108.

A nut 110 tightens the inner race of bearing 109 against a ring 111' which in turn is tightened against the shoulder 112' of shaft 25. A ring 111 (Fig. 8) spaces the inner race of bearing 101 from a shoulder 112 of fixed shaft 25 and is spaced by sleeve 113 from bushing 20 (Figs. 9, 9A and 10).

The hub 100 (Fig. 8) provides three blade sockets 120 which receive the root portions 121 of propeller blades. Portions 121 are journaled in stack bearings 122 the balls of which are supported as a string received by the grooves 123 of the root and are retained therein by the outer races 124 which are all retained by a nut 125. The blades 121 in the rear hub 100 are angularly spaced, or staggered, from the blades 121' in the front hub 105 as clearly seen in Figure 1. More particularly, the blades in one hub have a fixed lead angle with respect to the blades of the other hub so as to overcome shock interference between the blades of the two axially spaced hubs which rotate in the same direction and wherein the blade tip speed may exceed the speed of sound.

The hub 100 receives a triangular block 130 (Figs. 14–18) referred to hereinafter as the "island." Island 130 is provided for the purpose of eliminating from the hub 100 an internal, integral portion shaped to receive parts of the blade-pitch changing servos and the bridging webs which would be required to support said portion from the wall of the hub. Therefore, the interior surfaces of the hub are defined by an axial bore which receives the island 130 and thru radial bores which receive the blade-root bearings. The interior surfaces are those of intersecting cylinders of relatively large diameter. These surfaces are finished smooth and the lines of cylinderintersections are rounded off so that there are no sharp edges or corners where a structural failure could start. The exterior surfaces of the hub are finished smooth and shot-peened to compact the metal of the hub so that the liability of starting a structural failure due to vibration fatigue is reduced to a minimum.

Island 130 provides mounting pads 131 each shaped to receive the inner race of a ball bearing 132 (Fig. 8), the outer race of which is received by a cylinder 133 splinedly connected at 134 with the propeller root 121. The head 135 of cylinder 133 provides a seal ring 136 contacting the cylinder and it is urged against a split wire snap ring 137 by a leaf spring 138 the ends of which bear against the ring 137 and the central portion of which is forced by a screw 139 against the central portion of the head 135. Cylinder 133 receives a piston 140 connected by helical splines 141 with cylinder 133 and connected by helical splines 142 with a fixed sleeve 143 splined at 144 to the pad 131 and held upon a seat 145 by a washer 146 which is retained by a plug 147 screwed into the pad 131. Screw plug 147 supports a tube 150 which extends from a pocket 151 of the pad 131 radially outwardly through a stuffing box 152 provided by piston 140. The three pockets 151 are connected by passages 153 with an annular groove 154 of a sleeve 155 which is press fitted and copper brazed into the island 130. Groove 154 is connected by passages 156 and 157 with a tube 158 which, in a manner to be described, is connected with a source of pressure fluid which, by a valve to be described, is caused to supply oil to the outer ends of the cylinder 133. In order to connect the pressure fluid distributing valve with the inner ends of the cylinder 133 each mounting pad 131 provides a passage 160 which communicates with the interior of the cylinder through notches 146a of the washer 146. The passages 160 are connected with an annular groove 161 of sleeve 155 and groove 161 (Fig. 16) is connected by a passage 162 with a passage 163 which is connected with the distributing valve in a manner similar to the connection of passage 157 (Fig. 8).

The cylinder 133 provides a bevel gear segment 170 meshing with a bevel master gear 171 journaled in a ball bearing 172 supported by a ring 173 supported by hub 100. Gear 171 is splined at 174 to a tube 175 which as shown in Fig. 7 is splined at 176 to the master gear 171' (Fig. 7). The parts of the torque units or servo motors of the front propeller blades are substantially like those for the rear propeller blades. Therefore, the parts which are alike are designated by the same reference numerals with primes affixed.

The island 130 may shift slightly in order to accommodate itself to the tolerances of the fit between the parts connected with the island and the parts connected with the hub 100.

Axial shifting of island 130 is limited by sleeve 180, on the left, and, on the right, by ring 173 spaced by shims 181 from ring 182 which bears on the outer race of bearing 101. Axial shifting of island 130' (Fig. 7) is limited by sleeve 108, on the left, and, on the right by master gear 171'.

Referring to Fig. 7 the bearing 172' of gear 171' is supported by the ring 190 which a dowel pin 191 fixes in a definite angular relation to the sleeve 103 while providing for a slight axial adjustment of ring 190. Screws 193 attach to ring 190 a nonconducting ring 194 which supports a rheostat resistance 195 wound upon a nonconducting ring 196. Coil 195 is engaged by a wiper 197 extending from a plate 198 carried by a nonconducting ring 199 connected by a ball spline 200 with tube 175. A spring 201, surrounding sleeve 175 and confined under compression and torsion between ring 199 and a shoulder 202, urged the ring 199 against the ring 194 so that the wiper 197 will bear against the rheostat coil 195. An end 203 of spring 201 is received by a notch in the shoulder 202 and is retained by a band 204. One function of the spring 201 is to maintain engagement between rings 199 and 194, and another function is to take up, in one direction, the clearance slack at the ball spline 200 which connects the ring 199 with the sleeve 175.

Ring 111' (Fig. 7) and ring 111 (Fig. 8) are parts which cooperate with fluid seals. Ring 111 (Fig. 8A) supports an enclosing shell 210, an annular leaf spring 211, a ring 212 which receives coiled springs 213 which urge a sleeve 214 to the left to cause a seal ring 215 carried thereby to engage a seal ring 216 carried thereby to engage a seal ring 216 which is supported by ring 173. Bearing 101 receives lubricant from the space between sleeve 113 and shaft 25 through an orifice in the sleeve 113 (not shown) which receives lubricant from the gear box lubricating system (Figs. 9 and 10). Excess of lubricant is conducted away by duct 218 (Fig. 8). The seal associated with ring 111' is similar and like parts are marked with like reference numbers with primes affixed. Other seals are provided by O-rings marked s.

Figures 15–18 serve to illustrate islands 130 and 130'. The front island 130' has three holes 220 for receiving wiring conduits (not shown) for enclosing wires that connect the rheostat coil 195 and the wiper blade 196 with wiring connections in the regulator. The front island 130' is provided with holes 221 (Fig. 15) to balance the mass rotatively. The rear island 130 has no wiring holes 220; and, since it has ducts 157 and 163, it may have a hole located at a position corresponding to the position of the center one of the three holes 220 in order to balance it rotatively.

Referring to Fig. 6, screws 223 and nuts 224 fasten to plate 107 a regulator base 225 and a cover 226 having fins 227 enclosed by a cover 228 which screws 229 attach to cover 226 together with a ring 230. The fins 227 induce a flow of air across a brush and slip ring assembly 264, 267 when the regulator rotates to thereby cool the brush and slip ring assembly. Cover 226 supports a seal 231 which engages a sleeve 232 surrounding the shaft 25 and supporting a ring 233 which supports three scoops 234 for picking up hydraulic fluid contained in the space between cover 226 and base 225, said fluid being conducted from the scoops 234 through an annular channel 235 and thence through channels 236 to an internal annular channel 237 of base 225. From channel 237, fluid passes to certain pumps mounted on base 225.

Sleeve 232 provides a gear 238 for driving certain pumps and a slightly eccentric annular flange 239 which operates to vibrate a governor valve mounted on base 225. Sleeve 232 is splined to a flange 40 of nut 110 which abuts the inner race of bearing 109. Sleeve 232 is abutted by sleeve 241, an O ring seal 242 being supported by the abutting sleeve edges. Sleeve 241 is abutted by a shim 244 which spaces sleeve 241 from sleeve 243.

Referring to Fig. 5, sleeve 243 has a flange 245 which abuts a collar 246 supported by shaft 25. Screws 247 and nuts 247a fasten to collar 246, plates 248 received by notches 248a of sleeve 243, notches 248b of collar 246, and notches 248c of shaft 25. Nut 249, threaded on shaft 25, clamps the collar 246 against the flange 245 of sleeve 243 and forces the latter together with sleeves 241 and 232 (Fig. 6) against nut 110. Shaft 25 being stationary, collar 246, sleeve 232 which is splined to nut 110; and sleeve 243 which is engaged by plate 248, will not rotate relative to shaft 25. However, sleeve 241 is free to rotate. Collar 246 is attached to a tube 250 which supports collar 251 (Fig. 5) and collar 252 (Fig. 5B) which support the spinner in a manner to be described.

Sleeve 243 provides a flange 253 to which screws 254 and nuts 254a secure a ring 255, a grounding brush ring 256 and a ring 257. Screws 258 (Figs. 6 and 5A) and nuts 258a secure to ring 255 nine brush holder rings 259 which are insulated from each other by non-conducting tubes 262 through which screws 258 extend. Each ring 259 provides a groove 262a (Fig. 6A) which receives a garter band 263 which presses against brushes 264 received by radial slots of the rings 259. The grounding ring 256 also receives a garter band which urges brushes radially inward. The brushes supported by grounding ring 256 are urged against a grounding collar ring 266. The brushes, supported by the insulated brush holder rings 259, are respectively urged against slip rings 267 supported by a tubular extension 268 of cover 226. Screws 269 and nuts 269a clamp the rings 266 and 267 against insulating rings 270, the grounding collar ring 266 being confined between the left-hand nonconducting ring 270 and a metal ring 271 which fits around the tubular extension 268.

Referring to Fig. 5A, shaft 25 supports a cable including ten wires, wire 272 being a ground wire connected with the screw 254. The nongrounded wires 273 of the cable are respectively connected with the insulated brush retaining rings 259 (Fig. 5B) by means of rods 274 which are insulated and which rods are respectively connected each with a separate insulated ring 259.

Referring to Fig. 6, each of the insulated collar rings 267 is connected with a rod 275 extending through a nonconducting tube 276 and the right end ring 270 which, as shown in Fig. 6B, is provided with nine grooves 277, each receiving the end of a resilient conductor blade 278 (Fig. 6) insulated by plate 279 and connected by a screw 280 (retained by nut 280a) with a strap 281 received by a groove 282a of a nonconducting plate 282. Screw 280 is insulated from cover 226 by a tube 283.

Referring to Fig. 6B, there are three rods marked 275a, 275b, and 275c which are used to make connection with a potentiometer. Each of these rods is connected as shown in Fig. 68, with a strap 281 and each strap 281 engages a rod 284 which passes through a nonconducting spacer 285, a metal tube 286, a strap 287 and an insulating block 288 which is supported by regulator base 225. A nut 284a, threaded on the right end of the rod 284, urges a shoulder 284b of rod 284 against spacer 285 which is urged against the tube 286 which is urged against the strap 287. Each of the three straps 287 is electrically connected with a screw 298 (Fig. 69) retained by a nut 289a which clamps an insulating bushing 290 against a shoulder 290a of a pocket in regulator base 225. Each screw 289 makes contact with a conductor 291 passing through a bushing 292 insulatingly supported by plate 107. Each of the three conductors 291 is electrically connected with a core wire of an insulated cable 293 which passes through a tube 294 supported by island 130'. The holes 220 (Fig. 16) with which island 130' is provided each receive one of the tubes 294. Two of the wires 293a and 293c are connected, as shown in Fig. 71, with the ends of resistance 195, shown in Figs. 7 and 69. The other wire 293b is connected with the wiper 197.

Referring to Fig. 6B, three of the rods marked 275d, 275e and 275f serve to connect insulated collar rings with blades 278, each of which, as shown in Fig. 52, is connected through screw 280 and strap 281 with a terminal rod 300 of a three-phase electric motor M which drives a three-gear pump P3.

Two of the rods marked 275g and 275h (Fig. 6B) are each connected by a blade 278 (Fig. 48), a screw 280 and a strap 281 of two insulated terminals of a solenoid valve unit SV (Figs. 48 and 71). There are two terminals 301 and 302, one being marked 301 in Fig. 48. As shown in Fig. 71, the terminals 301 and 302 are connected respectively with ends of coils 303 and 304 which are connected with ground represented by wire 305 in Fig. 71. This ground is, in fact, the regulator base which is electrically connected with the grounding collar ring 255 and its brushes. As shown in Figs. 47 and 48, connection between terminal 301 and the coil 303 of the solenoid is effected by a strap 306 supported by an insulator 307 secured to the valve SV by screws 308. The strap is secured beneath a collar 301a of the terminal and connects with a screw 306a and thence to the wires 301 or 302, with the ground connection 305 similarly connected through a bushing 309 to one of the screws 308.

The rod marked 275i in Fig. 6B, is connected in a similar manner, as shown in Fig. 63, by blade 278, a screw 280 and a strap 281 with a terminal 310 with the coil 316 of a beta control valve unit BCV, the case 311 of which provides an arm 312 which insulatingly supports terminal 310 by a bushing 313 and a plate 314. Nut 310a, threaded on terminal 310, retains the assembly of parts which includes a metal strap 315 which electrically connects terminal 310 with coil 316 of unit BCV. The other end of coil 316 is connected with the ground circuit through the regulator base 225 to which unit BCV is attached.

Referring to Figs. 7, 8, and 14, particularly Fig. 8, double acting fluid servo units are provided by the cylinder 133 and the piston 140 which divides the cylinder into two variable volume chambers. These chambers are an increase pitch chamber 140a and 140b a decrease pitch chamber, the latter of which is connected by pipe 150 with the annular groove 154 and passages 156 to a passage 157 located in the island 130 as has been explained. All of the increase pitch chambers 140a are connected by passages 160, 161, to passages 162 and 163 also located in the island 130, Fig. 16. Thus the passage 157 connects with all of the decrease pitch chambers 140b situated in any one hub, and likewise the passage 163 connects with all of the increase pitch chambers 140a of any one hub, which gives coincident shift of all the pistons in the blades, and which are maintained in exact incidence by reason of the master gear 171.

Referring to Figs. 6, 7 and 8 the decrease pitch passage 157 is connected by tube 158 to the passage 157' of the island 130' which opens into the short tube 400 connecting with a passage 401 in the sleeve 108 from where it connects thru a transfer seal 402 to a regulator terminal port 403 located in the regulator base plate 225 Figs. 19, 20 and 31. By similar means, not shown, the increase pitch passage 163 is connected with a regulator terminal port 404 also located in the regulator base plate 225 as shown in Figs. 19, 31 and 42.

The regulator base 225 forms one element of the hydraulic regulator mounted in front of the propeller construction and when properly associated with the cover 226 and the sleeve 232 forms an annular reservoir 405 as indicated in Fig. 6. The elements 225 and 226 rotate about the fixed sleeve 232 when the propeller rotates and thereby rotates a quantity of fluid medium contained within the reservoir which impinges upon the openings of the pickup tubes 234 Figs. 51, 67. The fluid flowing thru 234, 235 and passage 236 keeps the undercut passage 237 of the base plate filled with the fluid medium from which the controlled mechanism is supplied Figs. 50, 51. As shown in Fig. 6, the fluid from one of the passages 236 is directed through an opening 236a to a space between the 232 and the shaft 25 from where it makes its way beneath the flange 240 of nut 110 and through a bore 110a for lubrication of the bearing 109. A plug 236b in the end of one of the passages 236 insures the fluid being delivered under pressure. The regulator base plate 225 forms a mounting for all the control apparatus as shown on Fig. 47 and also imbeds a system of plumbing made up of pipes and passages and mounting blocks as shown in Fig. 31 for properly connecting the control elements shown in Fig. 47 to effect fluid connections schematically illustrated in Fig. 71. In Fig. 6 which shows an axial section there the regulator, the illustration of the control elements has been purposely omitted for simplicity and clearness of illustration of other features. As shown in Fig. 6 the regulator base plate 225 is mounted in front of the hub 105 by means of bolts 223 securing it to the plate 107 which, in turn is secured to the hub 105 by bolts or screws 106, there being recesses or pockets 406, Figs. 19, 24, in the regulator base plate 225, for clearance with respect to the heads of the bolts 106. Fig. 19 shows the mounting side of the base plate 225 and includes the recesses 406, one of which joins a recess 407 with a pocket 408, Fig. 21, and a thru passage 409 suitable for mounting an outside filter as shown in Fig. 56. Other details on the back side of the regulator base include the regulator terminal ports 403 and 404, Figs. 20, 42, 49, as well as a recess 410 which has three holes 289b for reception of the screws 289 and bushings 290, Figs. 67 to 69, by which electrical connection with a potentiometer 195 and 197 is made. A counterbored hole 411 through the plate 225 connects with a surface groove 412 on the front side of the base plate 225 as shown in Figs. 25, 30, and 55 near the mounting station P3S for the feathering pump.

Fig. 25 shows the front face of the regulator base plate 225 and indicates mounting stations and ports for accommodation of the control elements shown mounted in place in Fig. 47. Connection of those stations and ports by the tubage of Fig. 31 accomplishes the fluid circuit shown in Fig. 71. Thus, a mounting pad provides a station P1S for the system pump P1, and a second mounting station P2S for the mounting of the system pump P2. The mounting station P3S is provided for mounting the motor driven feathering pump P3. A mounting pad PCVS provided for mounting the pressure control valve and a mounting pad BCVS provides a mounting station for the beta control valve BCV. The governor valve GV is mounted at the station indicated by GVS. At station SVS there is mounted a solenoid valve SV and at the station FCVS there is mounted the flow control valve FCV that controls the addition to the system by the pump P3. At openings 413 and 414 intake ports for the pumps P1 and P2 are provided that open into the pump supply channel 237 somewhat as shown in Figs. 45, 50 and 51.

The mounting pads providing the stations shown in Fig. 25 have ports or openings that are connected by tubes and passages somewhat as shown in Fig. 31 for properly connecting the control elements shown in Fig. 47 in accordance with the schematic view in Fig. 71. The tubage assembly of Fig. 31 with its mounting stations is embedded in the body of the base plate 225 such as by casting or moulding, and then the base plate is machined to a plane surface as indicated at 415 in Figs. 6, 44 and 45.

Referring particularly to Figs. 25, 31 and 71, pad P1S has a port 416 that opens into passages 417 and 418 as shown in Figs. 28, 32 and 45 forming a pressure delivery line from port 419 in pad P2S that connects with passage 417, as shown in Fig. 35. The other end of passage 418 empties into the chamber 408 of station PCVS this chamber having the port 409 leading to the pressure control valve, Figs. 44, 56. This chamber 408 is the receptacle within which is disposed in externally removable filter unit earlier referred to and shown in Fig. 56. From a port 419a in the pad PCVS a passage 420 extends to a pressure supply port 421 of the mounting pad SVS to which is also connected a passage 422 connecting with a port 423, Fig. 29, of the mounting pad FCVS supporting the flow control valve for the motor driven feathering pump P3. A port 424 in the mounting pad PCVS is connected by pipe 425 with the regulator terminal port 403, Fig. 20, which connects by short passage 426, Fig. 39, to the pitch decrease port 427 located in the pad SVS for the solenoid valve. There is a passage 428 also connecting the regulator terminal port 403 with a port 429 in the pad BCVS, Fig. 37, which supports a beta control valve. A port 430, Figs. 44, 56 and 31 in the face of pad PCVS connects by passage 431, Fig. 37, with port 432 of the mounting pad BCVS, and a port 433 of the pad PCVS connects by pipe 434 with port 435 of the pad BCVS, while a port 436 of the pad BCVS connects by passage 437 with a pitch increase port 438 of the pad SVS which port is also connected by passage 439 with the regulator terminal port 404. A governor supply port 440 located in the pad BCVS is connected by a pipe 441, Fig. 40, with a terminal opening 442 of GVS while terminal openings 443 and 444 of the same pad connect by pipes 445 and 446 with ports 435 and 432 respectively of the pad BCVS. In the station pad FCVS for the flow control valve there is a port 447, Fig. 29, that connects by pipe 448 with two ports 449 opening to the face of pump station pad P3S, Fig. 44. A port 450 in the pad FCVS connects by pipe 451 with a clearance slot 452 in the pad P3S, and opens at port 453 to the surface of the plate. There are grooves 454 in the pad P3S that join the clearance slot 452, Fig. 30. Located adjacent the pad P3S there is port 455 that connects by pipe 456 with a pad 457 having an opening 458 at the edge of base plate substantially as shown in Fig. 27. The opening of this pad forms a pump intake port leading by passages 456 to 455 to supply the feathering pump P3 which is a three-element pump as shown in detail in Figs. 52 to 55 inclusive. A second intake passage for this pump is provided by the ports 459 in the face of the base plate 225 which opens into a radial passage 460 extending to the edge of the plate shown in Figs. 25–44 and 55.

The base plate 225 provides other elements of structure such as apertures, recesses and the like that enter into mounting of the control elements on the plate, but not necessary to be described. Mention of some of the elements may be made as the description proceeds with the mounting of the control elements on the face of the base plate (Fig. 25) as shown in Fig. 47, where they will be connected into the hydraulic circuit shown on Fig. 71, by the tubage assembly of Fig. 31. With reference to Figs. 25, 31 and 47, generally description of the control elements and their connection into the hydraulic circuit of Fig. 71 should follow the order of fluid pressure source development, fluid pressure control and regulation, and distribution of control forces; specific reference being made to other views of the drawings as their pertinency appears.

*Fluid pressure source*

Pumps P1 and P2 are system pumps and are mounted on stations P1S and P2S of the Fig. 25. These pumps are substantially identical in structure, being of the conventional gear type pump where a protruding shaft 461 carries a spur gear 462 that meshes with the tooth flange 238 of the sleeve 232 (Figs. 6, 50 and 51). The pumps comprise a body portion 463 enclosing the oil gears and have inlet ports 464 communicating with the openings 413 or 414 that open into the groove 237. The outlet passage 465 of the pumps is fitted with a check valve 466, the outlet side of which for pump P1 opens into port 416 of the base plate 225 and for pump P2 opens into port 419 of plate 225. Whenever there is relative rotation between the regulator plate 225 and the sleeve 232 the pumps P1 and P2 will be revolved around the shaft 25 and other stationary structure so that the pump gears 462 will roll about the toothed flange 238. The pick up tubes 234 will feed hydraulic medium to the grooves 237 and also boost the pressure on the inlet side of the pumps, from whence the pumps will pick up the fluid and deliver it under pressure thru the check valve 466 and thru the plate ports 416 and 419.

The fluid pressure from port 419 follows tubular passage 417 to the port 416 where the fluid is joined to the output of pump P1 and then flows thru passage 418 to the pocket 408 at the station PCVS.

The pressure source provided by pump P3 is an auxiliary or supplementary source selectively added to the source provided by the system pumps P1 and P2. Referring to Figs. 52, 53, 54 and 55 the pump P3 comprises a flat plate 467 and a flanged plate 468 providing journals for a series of three intermeshing pump gears 469 located in intersecting apertures 470 of a spacer plate 471. The plates 467—468 are provided with bearing apertures 472 within which are journaled the pintels of pump gears 469. When the gears are disposed in the apertures 470 of the plate 471 all three plates 467, 468 and 471 are held together in fluid tight relation by clamp bolts passing thru apertures 473 and threading into plate 468, there being seal rings disposed in grooves 474 of the plates 467 and 471 and surrounding the pump structure. Dowel pins disposed in the apertures 475 of the plate 467, 468 and 471 insure proper alignment of the pump structure when the plates are clamped together. The spacer plate 471 in addition to the apertures 470 provide L-shaped branches 476 and 477 as intake openings, each for an intermeshing pair of pump gears, and also provide outlet branches 478 opposite each pair of gears and one of the inlet openings. A drain opening 479 in the plate 471 coincides with an opening 480 in the plate 467, which latter plate has openings 481 and 482 matching the inlet openings 476, 477, and a pair of apertures 483, each matching an outlet branch 478.

Mounting the assembled pump P3 on the base plate 225, a pertinent portion of which appears in Fig. 55, aligns the intake ports 481, 482 with the ports 455 and 459. The outlet ports 483 of the pump are aligned with port 449 of the plate 225 and the drain ports 479, 480 of the pump are aligned with a plate port 453. The journalled openings 472 and clamp bolts in the aperture 473 will be disposed in the cross slots 452 and 454 on the surface of the plate 225 so that leakage from the pump elements may find its way back to the drain passage 451, Fig. 30. Actuation of pump gears 469 will then pick up fluid from the reservoir 405 thru either or both passages 460, 459 and 482 or thru passages 458, 456, 455 and 481. The output of the pump from between each pair of meshing gears is by way of branches 478, port 483 to plate openings 449 and thence into collecting passage 448.

Pump P3 is selectively driven by electric motor M which comprises a housing 484 enclosing a field winding 485 surrounding a rotor 486 journaled in bosses of the housing 484 and plate 468. The rotor motor has a shaft 487 that drives the intervening one of the intermeshing pump gears 469, and the terminals of the field winding 485 are connected with conductors 300 mounted in insulators 488 supported by a lug or arm 489 of the housing 484. Control and selected operation of the motor driven pump will be explained in due course, and its addition to or segregation from the source of system pressure will be described in connection with pressure control and regulation.

*Pressure control and regulation*

The control and regulation of pressure in the system comprehends pressure regulation according to the needs of the system which is accomplished by an assembly of valves designated as pressure control valve PCV illustrated in Figs. 56 to 58a inclusive and also takes into account supplementary and selectively operable pump means which may be added to the source of system pressure thru the operation of the flow control valve FCV which is illustrated in Fig. 62. Referring to Figs. 56 to 58A, the pressure control valve PCV comprises a chambered body 490 mounted on the regulator base 225 by bolts or screws as is usual with the other control elements. The body 490 has four bores 491, 492, 493, 494, each with a porting sleeve 495, 496, 497, and 498 respectively. The bore 491 has three openings 499, 500, and 501 adapted when the valve is mounted on the base plate 225 to register with ports 409, 430, and 433 respectively. Housed for movement within the bore 491 is an equal area valve 502 urged by a spring 503 against the damping head 504 to project a land 505 in close relation with respect to a port 506 provided by the porting sleeve 495. The valving land 505 is slidable within a bore of the porting sleeve 495, and is opposed to a pressure face 507 always exposed to the pressure at the port 501 thru port 508. The port 506 opens at 509 into the bore 492 which houses the porting sleeve 496 that provides a port 510 to a central bore housing a relief valve 511 urged in closing relation by a spring 512 housed inside of the ported sleeve 496. The relief valve 511 has a fluted head 513 adjacent a groove 514 and the end of the valve is exposed to the chamber 515 connected by port 516 to the bore 491 of the equal area valve. A port 492a opens from the bore 492 of the relief valve to the outside of the body 490.

Upon reference to the Fig. 56 it can be seen that fluid pressure at the port 409 is also found thru port 499 in the bore 491 and the upper face of valving land 505 as well as thru port 516, chamber 515 and as far as groove 514. If pressure is trong enough in bore 492, and when acting upon the face of land 505 it will compress the spring 503 until the pressure is relieved thru port 506 into bore 492 outside of porting sleeve 496 to exhaust at 492a. This escape of pressure thru port 506 may be modified or regulated or varied due to pressure existing in the lower face of area 507 applied thru 508 and 501. The pressure in the bore 491 is always the same in chamber 515 and if it is strong enough, acts upon the end area 511 to compress the spring 512 and groove 514 will open the port 510 allowing flow around the porting sleeve 496 and exit at 492a.

As shown in Fig. 57b the bore 491 of the equal area valve is cross connected at 517 with bore 494 housing a pressure reducer valve 518. The bore 493 and bore 492 are similarly connected by a cross connection 519. As shown in Fig. 57a the bore 491 is similarly connected to the bore 493 by a cross connection 520. The bore 493 with its port sleeve 497 provides a seat for a ball check valve 521 Fig. 57 urged to closed position by a spring 522 normally closing communication between a cross connection 520 and the port 424 of the base plate 225. That is because the porting sleeve 497 has port 523 communicating with cross connection 520 which opens into bore 491 and thence thru port 500 to port 430 and also because the porting sleeve provides ports 524 on the outlet side of the check valve that opens into 419a of the base plate 225. A channel 525 about the porting sleeve 497 connects with 519 and a port 526 fitted with an orifice 527 adapted to register with plate port 424.

Housed within a bore 494 is the porting sleeve 498 that slidably receives the pressure reducing valve 518. The porting sleeve has ports 528 opening from the bore 494 that communicates with 517 to the inside thereof. The valve 518 has a central bore 529 with lateral openings 530 adapted to register in metering relation ports 528. A spring 531 tending to keep the connection open. Pressure admitted thru 517 flows thru 528, 530 and 529 to flow out of a channel 532 in a cap member 533 closing the end of the bore 494. If pressure is built up in 529, it is applied against the end of the valve 518 to move the valve downwardly against the spring as shown in Fig. 57 until it cuts off the admission of pressure at 528 and 530. The channel 532 opens at the other end into a pocket 534 fitted with a filter element 535 from which pocket and from the outside of the filter leads the cross connection 519, connecting with channel 525 and restriction 527 to port 526.

The fluid pressure and flow that is controlled and regulated by the pressure control valve PCV enters the unit by port 499 which registers with plate port 409. The port 409 is the supply port from the pressure system fed by the pumps P1 and P2 emptying into the pocket 408 thru passage 418. Disposed in the pocket 408 a filter assembly 537 made up of a cup 538 having a seal ring 539 engaging the wall of the pocket 408 and ports 540 covered by a filter screen or similar element 541. A flanged screw cap 542 threads into the mounting pad PCVS from the back side of the plate 225 to secure the filter assembly in place and to insure that all fluid flow entering the pocket 408 must flow thru the filter element 541 and the opening 549 before that fluid can reach the port 409. The filter element is thereby removable from the outside of the regulator due to the clearance afforded by the openings in the plate 107. The fluid circuit connections thru the pressure control valve assembly PCV is shown in somewhat simplified arrangement in Fig. 71.

The flow control valve determining the connection and disconnection of the output from pump P3 to the fluid pressure system is shown in its structural relation in Fig. 62. This valve comprises a body 543 providing ports 544, 545 and 546 adapted to register with plate ports 423, 447 and 459 respectively. The port 544 opens into a pocket 547 enclosing a ball check valve 548 whose high pressure side opens thru port 549 from the port 545, and the port 544 also opens by port 550 into a longitudinal bore 551 of the body 543 which bore 551 also opens into ports 545 and 546. The bore 551 encloses a tubular liner 552 that slidably receives and guides a valve stem 553. The liner 552 has three sets of ports 554, 555 and 556 arranged to open respectively to the ports 550, 545 and 546 of the body 543. The valve stem 553 has a stop flange 557 engaged by a spring 558 to normally seat against the end of the liner 552, in which position a valve land 559 closes a port 556 of the liner and in which a land 560 is positioned intermediate the ports 554 and 555 which provides a servo chamber 561 at the end of the liner and that open by ports 554 thru port 550. When the valve assembly FCV is mounted upon the station FCVS as shown in Fig. 62 the port 544 will be connected with port 423 and passage 422 of the base plate 225 which is always subject to the pressure potential in the system. The pressure in the port 544 has free access to the servo chamber 561 and therefor when amounting to a predetermined value acts upon the face of the land 560 to move the valve plunger 553 against the spring 558. The valve plunger thereby moves sufficiently to connect the ports 555 and 545 with ports 556 and 546. Port 447 is the pressure supply port from the pump P3 by way of the passage 448 and thus if the pump P3 is operating, the fluid flow therefrom passes from port 447 into port 545 thru 555 and 556 into port 546 and drain passage 451 by 450, this drain passage leading to the station P3S where it passes into the motor housing thru port 453 thereby cooling the motor and making its exit to the reservoir.

If the system pressure in passage 422 and port 423 is less than a predetermined value, which is measured by the pressure equivalent to the force of spring 558, the valve stem will not be raised to connect ports 555 and 556. The pressure from pump P3 entering thru port 447 and 544 cannot then flow thru port 556 and thus must pass thru port 549 against the resistance of the ball check valve 548 and thence from pocket 547 thru port 544 into the system passage 422.

By these means of pressure control and regulation of the source of fluid under pressure is always available at the plate port 442 for the governor valve GVS and at the port 421 for the solenoid valve, from which points directed application of fluid pressure is made for control of the engine propeller mechanism, to accomplish any one of the various regimes of operation.

*Distribution of control forces*

The application or distribution of control forces to the engine-propeller combination is effected by devices that act upon the fluid pressure system for governed operation, and for manually controlled operation in lieu of governed operation. The manually controlled means selects the datum of governed operation and determines whether the control effected is applied in a positive or negative sense. Governing at any level, after selection by the manually controlled means, is accomplished essentially by the solenoid valve SV, guarded under certain conditions by the governor valve GV acting in the nature of a standby or overspeed governor. The solenoid valve SV may be the structure shown and claimed in application Ser. No. 97,724 or some equivalent thereof, portions of which are shown in Figs. 47, 48 and 48A. A valve body 562 provides a central bore 563 with ports 564, 565, 566 so located as to register with the ports 427, 421 and 438 respectively provided by the base plate 225. Within the bore 563 there is a porting sleeve 567 having a plurality of ports 568 arranged in rows about the sleeve so that each row opens to one or another of the ports 564, 565 and 566. Movable within the bore of the porting sleeve 567 there is a valving sleeve 569 actuatable by a reciprocating rod 570 to shift the valving sleeve 569 to either side of a medial position where it is normally held by centering springs 571 so that lands 572, 573 normally stop fluid flow from a medial groove 574 to either of the ports 564 or 566. On opposite ends of the valve body 562 there are secured solenoid units 575 and 576 that provide the windings 303 and 304 earlier described. The solenoid units 575 and 576 surround armatures carried by the valve rod 570 are adapted to shift the valve sleeve 569 for uncovering the ports leading to the increased pitch port 404 and decrease pitch port 403 provided by the regulator base 225. Electrical connections from the solenoid windings by way of the terminals 301 and 302 make for selective control of the solenoid valve in directing fluid pressure from the port 565 available thru plate port 421 to either side of the servo motors in the propeller blades.

The overspeed governor GV is shown in detail in Figs. 59, 60 and 61, and provides a valve body 577 having a longitudinal bore 578 within which is fitted a porting sleeve 579 with a series of ports 580, 581, and 582 communicating with ports 583, 584 and 585 in the mounting face of the body 577 when the valve assembly is mounted on the station GVS. When the valve is so mounted port 583 opens into port 442 of the plate 225 while valve port 584 opens into port 443 and valve port 585 opens into port 444. Fluid pressure of the system is therefor available at the port 583 thru port 442, passage 441 and port 440 of the valve pad BCVS. Control of flow from port 583 thru 580 and thence thru ports 581, 584 and 443, is controlled by a spool valve 586 slidable within the bore of the sleeve 579 and having valving lands 587 and 588 cooperable with parts 581 and 582. The valve spool 586 is articulated at 589 to a lever 590. In the quiet state the lever 590 is urged against a fixed fulcrum 591 and a stop rod 592 by springs 593 and 594 carried by a bracket 595 secured to the body 577. A flanged nut 596 and screw device 597 provides for adjustment of the springs 593 and 594. A leaf spring 598 clamped between rails 599, 600 and the opposite end of the body 577 act to yieldably support and position the lever 590 so that the lever is always in articulated connection with the valve spool 586. These rails also support the fulcrum 591 and rod 592.

Pivotally connected to one end of the rail 600 at 601 there is a lever 602 the end 603 of which engages on the under side of lever 590. A wear piece 604 on the underside of the lever end 603 is adapted when the governor valve GV is mounted on the plate 225 and assembled within the regulator as shown in Figs. 6 and 47, to ride upon the cam surface 239 of the sleeve 232. The opposite end 605 is provided with a wear piece 606 which also rides upon the cam surface 239. The wear pieces 604 and 606 both riding upon the cam 239 causes the lever 602 to oscillate about the pivot 601 and follows the eccentricity of the cam 239. The parts are so fashioned and designed that when assembled within the regulator and under conditions of rest, or nonrotation of the regulator, the lever 590 will be supported at opposite ends by the fulcrum 591 and the lever 602 resting upon the cam 239. The intermediate portion of the lever 590 is engaged by the springs 593 and 594. During operation centrifugal force acts upon the lever 590 and the valve spool 586 tending to move the valve spool 586 outwardly so as to uncover the ports 581 and 582. When that movement takes place, then the pressure available at port 442 of the plate 225 and port 583 of the valve body is connected thru port 581 and 584 to the plate port 443. At the same time a plate port 444 and valve port 582 are open to drain in the lower end of the valve sleeve 579. The fulcrum 591 prevents inward movement of the valve plunger 586 thereby preventing connection of the pressure port 442 within the drain port 444.

The valve unit BCV is shown in Figs. 63 to 66 inclusive, and comprises a body 610 provided with a bore 611 housing a transfer sleeve 612 within which is fixed a porting sleeve 613 surrounding a valve sleeve 614. The spring 615 engaging an apertured head 616 in one end of the porting sleeve 613 urges the valve sleeve 614 against a head member 617 secured in the opposite end of the porting sleeve 613. That end of the valve sleeve 614 is closed off so as to provide a pressure chamber 618 adjacent the head 617.

The body 610 is apertured at 610, 620, 621, 622 and 623 for registry with plate ports 440, 432, 436, 435 and 429 respectively, and the body ports 619 to 623 inclusive register with grooves 624, 625, 626, 627 and 628 of the transfer sleeve 612. The porting sleeve 613 as shown in Figs. 63, 65 and 66 is provided with two longitudinal surface grooves 629 and 630, which have thru ports 631 at one end of the grooves and thru ports 632 at the opposite end of said grooves as shown in Figs. 66A and 65 respectively. The groove 628, Fig. 63 of the transfer sleeve opens by port 633 to the lower end of the grooves 629 and 630. Transfer sleeve 612 as shown in Fig. 66 has ports 634 that open from the channels 625, 626 and 627 to registry ports 635 extending thru the porting sleeve 613.

The valve sleeve 614 has grooves 636, 637, 638 and 639. In the spring urged position shown in Fig. 63 and Fig. 66, the groove 637 opens to connect channel 625 thru ports 634, 635 and by 631 and groove 629, to 632 then thru port 633 to channel 628 and thence by port 623 to plate port 429 leading to the decrease pitch port 403. The plate port 432 from which this connection started, communicates with the drain port 444 of the governor and with the port 430 of the pressure control valve. The groove 638 of the valve sleeve normally connects plate ports 435 and 436 by way of the channels 626, 627 thus completing the increase pitch line between the governor port 584 thru 445 and 437 to the increase pitch regulator port 484.

As shown in Fig. 63 the body 610 has a port 640 connecting groove 629 with a passage 641 of a magnet frame 642, at one end of which there is a pocket housing the ball check valve 643 and opening into a parallel passage 644 having a branch 645 connecting with an oblique passage 646 leading to the pressure chamber 618. The channel 624 opening by port 619 connects with plate port 440 that is open to system pressure and which also supplies the source port 583 of the governor valve. The check valve 643 is controlled by a pin 647 operated by an armature 648 under the influence of magnet 640 when the same is energized. Energization of the magnet attracts the armature 648 which operates by its pin 647 to unseat the ball check valve thereby allowing pressure fluid from port 440 to flow thru 619 and channel 624, port 640, passage 641 past check valve 643 and thence by channels 644, 645 and 646 to chambers 618, thereupon moving the valve 614 downward so that now channel 625 and 626 will be connected by groove 637 and so that channels 627 and 628 will be connected by valve channel 638 which reverses the connection between the governor valve ports 584 and 585 and the control passages 154, 166 leading to the blade actuating servo motor 133 (Fig. 71).

The control elements for the fluid pressure or hydraulic system, when mounted on the regulator base plate 225 as shown in Fig. 47 are connected into the tubage assembly of Fig. 31, to provide an hydraulic regulator capable of controlling the turbine-propeller combination in any selected regime of operation that may be dictated by a control organization. The assembled regulator is mounted on the front of propeller hub 105 and coupled with the slip-ring assembly as shown in Fig. 6, it being rotatable with the propeller about the fixed shaft 25, and relative to the brush assembly fixed to the shaft 25 as shown in Fig. 5. Wires 273 of a multi-conductor cable 25a lead to the rear through the hollow shaft 25 to make connection control organization of Fig. 72. The propeller hubs, blade, shanks, regulator and brush assembly are enclosed by spinner structure comprising an aft portion 671 and a fore portion 672 supported from bulkheads 673 from the rear hub and 674 of the foreward hub and rotate therewith (Fig. 4). The stationary portion of the spinner comprising a cone portion 675, truncated portion 676 is supported by bulkheads 677, 678 and 679 connected with collars 251, 252 supported by sleeve section 250 secured to the fixed shaft structure by members 246 and 255. With respect to the fore and aft portions of the rotating spinner they are apertured as at 680 to allow pitch change movements of the blades C. Each of the blades are fitted with a fairing collar boot 681 and are secured by collar 682 about the shank of the blade which collar supports a cone portion 683 having a base substantially the diameter of the opening 680. (Fig. 4A) The base of the cone 683 is closed by a warped disc 684 and closely fitting about the blades 121, 121'. The closure member 684 is so contoured that when the blade is adjusted in pitch to accomplish greatest efficiency the surface of the closure member 684 will preserve the cylindrical contour of the respective spinner section as shown in Fig. 4A. As the blade 121' is changed to other pitch positions there may be some irregular contour of the spinner surface as is shown in Fig. 4.

With the propeller assembly so constructed and arranged and installed on the fixed shaft 25 it will be properly connected for the hydraulic organization of the regulator to effect movement of the blades in their pitch shifting sense in answer to the dictates of the controller shown in Fig. 72, since the mounting of the regulator on the hub 105 makes fluid connection with the blade actuating servos thru the pitch change control forces in 403 and 404 as is shown in Fig. 71, which is a schematic diagram of the hydraulic organization within the rotatable propeller regulator, and functionally illustrates the operation of the hydraulic control elements in response to control signals received from a controller or control organization diagrammatically illustrated in Fig. 72. The circuity of control from the controller of Fig. 72 to the hydraulic organization of Fig. 71 includes the terminal indications by the small case letters a to j inclusive in both views.

The control system as it is applied to the turbine-propeller combination is illustrated in block form in Fig. 1A, where the turbine A drives the propeller C by the shaft 10, and drives an alternator 660 by shaft 661. The alternator has a three phase output proportional to the speed of the turbine-propeller combination and provides speed control feed-back by 662 to an electronic controller 663. Control signals from the controller 663 pass by 664 to the propeller C where corrections or adjustments are made to follow regimes of operation selected by the pilots control lever 665, and feeds back to the controller 663 by 666 the changes that have been made in the form of blade angle. The pilots control lever 665 operates through 667 upon a coordinator 668 to adjust the controller 663 by 669 for the selected operation of the turbine-propeller combination, and appropriately schedule fuel to the turbine by 670. Any adjustment of the controller changes the propeller A, which is a common element in two control loops, one a speed control loop including the turbine and alternator which has a speed control feedback to the controller by 662, the other a blade angle feedback to the controller by 666.

Referring particularly to Fig. 71, pumps P1 and P2 pick up fluid from the channel 237 which is supplied from the pick-up tube 234 while the propeller is rotating. Pumps P1 and P2 deliver fluid under pressure to inlet ports of check valves 466 which empty by passages 417 and 418 to port 499 of the pressure control valve PCV. From 418 connection is made by passage 516 with a chamber 515 of a pressure relief valve 511. The passage 520 connecting with port 500 of relief valve leads to a check valve 521 which connects by a passage 420 to a passage 422 that opens by port 565 as a supply port to the solenoid valve SV. Passage 422 also connects passage 420 to a port 544 of chamber 561 in the flow control valve FCV. A branch 441 from a passage 520 opens to a pressure supply port 583 of the overspeed governor valve GV. An additional branch 641 from the passage 520 leads to a normally closed port of the solenoid selector control valve 643, which is a part of the blade angle control valve BCV.

A branch 517 from the high pressure line 418 opens by port 528 to a pressure reducer valve in which a plunger 518 has ports 530 and 529 open to a passage 532. Passage 532 has a restriction or orifice 527 which opens into passage 425 providing a potential of about 600 p. s. i. The pressure reducer valve is so constituted that whatever pressure potential is in the passages 418 and 517 will be reduced to about 600 p. s. i. in the passages 532 and 425. The pump pressure within 418 may vary widely due to changes in speed of propeller rotation which drives the pumps P1 and P2, but that pressure is so regulated or controlled that it has a potential about 600 p. s. i. above the demand for flow when a control function is being applied. The equal area valve comprises a piston 505 and spring pressed plunger 502, that responds to pressure applied to both ends of piston 505, and the spring pressure to variably control the exhaust of fluid thru port 500. Thus, the same pressure that exists in passage 418 will be present at source port 528 of the pressure reducer valve, chamber 515 of the relief valve, the control port of the solenoid selector control valve 643, and the source port 583 of the overspeed governor valve GV. The controlled pressure of 418 will be present at the source port 565 of the solenoid valve SV, and the pressure chamber 561 of the flow control valve FCV, reduced only by the spring pressure of the check valve 521.

The demand element of controlled pressure potential in 418, includes the port 508 opening to the underside of piston 505, and connected by passage 434 and others with the increase pitch ports 584 and 566 of the overspeed governor valve GV, and of the solenoid valve SV both of which control flow of fluid to the increase pitch chamber 140a of the blade torque unit 133. The maximum pressure to which the system may rise is controlled by the relief valve 511 in the chamber 515, which upon rise of pressure to about 3000 p. s. i., opens to exhaust thru port 510 into the reservoir of the regulator.

Should the pressure in passage 422 fall below about 500 p. s. i. the pressure in chamber 561 of flow control valve FCV also decreases and allows a spring to shift the valve plunger 533 downwardly to close port 546 leading by passage 451 to the housing for feathering pump motor M. If the pump P3 is then operated, it picks up fluid thru the intake passages 457 and 460 and feeds thru passages 483 and 448 to passage 545. The outlet thru 546 being closed the fluid in 545 now passes thru 549 around the check valve 548 and thru passage 550 and port 544 to supply fluid under pressure thru 422 to the source port 565 of the solenoid valve SV. The pump P3 is selectively operated by the electric feathering motor M when current is received over wires 300 and the terminals d, e, and f.

The distribution of the fluid flow and pressure for controlling the movement of the propeller blades 121, is normally accomplished by the solenoid valve SV under the dictates of the controller shown in Fig. 72. The fluid distribution is also controlled in the case of tendency to overspeed, by means of the overspeed governor GV, and a third optional control is accomplished by the blade angle control valve BCV. The blade angle control valve BCV also operates under the dictates of the controller shown in Fig. 72. The solenoid valve SV includes the plunger 574 provided with spaced control bands 572 and 573, and is subject to the driving energy of the solenoid coils 303 and 304 grounded at 305 and connected by the wires 301 and 302 to the terminal points j and h, which lead to the controller of Fig. 72.

In the center position of the plunger 574, lands 572 and 573 close control ports 566 and 564 that open respectively into control passages 439 and 426 which lead to the regulator control ports 404 and 403. Regulator port 403 communicates by passage 154 to the decrease pitch chamber 140b of the blade actuating servo 133, and the regulator port 404 communicates by passage 166 with the increase pitch chamber 140a of the servo 133. Regulator control port 403 is also in communication by the passage 425 and the restriction 527 with the reduced pressure port of the pressure reducing valve. Also leading into the regulator control port 403 is the passage 428 connecting the ports 429 and 440 of the selector valve. The regulator control port 404 is connected by passage 437 to port 436 of the selector valve.

With respect to the overspeed governor valve GV, the increase pitch port 584 connects by passage 445 to port 435 of the selector valve, and has a feed back connection 434 to port 508 and lower chamber of the equal area valve plunger 505. Drain port 585 of the overspeed governor valve GV connects by passage 446 to port 432 of the selector valve. In the normal condition of operation, the lands 587 and 588 of the overspeed governor valve GV close the ports 584 and 585 under the urge of the spring 593 which acts upon the lever 590 to maintain the valve plunger against the stop 591. The plunger of the overspeed governor valve GV is kept free of static friction while the propeller is rotating, by means of the cam 239.

Calibration of the valve GV and its adjustment is such that, for speeds within the range of the governor and its control of the solenoid valve SV, there will be no control effected thru the ports 584, 585. Its setting is such that, upon an increase of speed beyond the limits effected by the governor, the ports 584 and 585 will be opened to allow fluid flow from port 583 to the increase pitch port 584 and passage 445 to port 435 and 436 of the selector valve, and these by 437 to regulator control port 404 and passage 166 to the increase pitch chamber 140a of the blade actuating servo 133. This will be a continuous flow instead of a pulsing flow that is effected by the solenoid valve SV. The drain back from the decrease pitch chamber 140b follows passage 154 to regulator control port 403 and thence by passage 428 to ports 429 and 440 of the selector valve, and by passage 446 to drain port 585 of the governor valve GV which port is now open. Under these conditions the plunger of the selector valve will be spring pressed to the upper position where the ports 429 and 432 will be connected, and the ports 435 and 436 will be connected.

Whenever the solenoid valve SV operates it distributes pulses of fluid under pressure alternately to the control ports 564 and 566 in such a manner that the alternating pulses are equal when the propeller is operating on-speed, and so that the alternating pulses are differentially unequal during off-speed propeller operation. The alternate pulsing of the solenoid valve SV is effected by the controller of Fig. 72, which impresses control signals over the terminals *g* and *h* and conductors 301, 302. Thereby, during on-speed governing equal alternating pulses are supplied to the passages 439 and 426 and pass thru regulator control ports 404 and 403 respectively, and thence by passage 166 and 154 respectively, to the opposite sides of the piston 140 in the blade angle servo 133. Hence, there is no change in position of the blade 121. If an over-speed exists, the solenoid valve SV directs a larger pulse to passage 439 than it directs to passage 426. Hence, more flow is applied thru passage 166 to the increase pitch chamber of blade angle servo 133 and a smaller pulse is applied thru 154 to the opposing chamber. If an underspeed condition is experiences, a reversal of conditions obtains. The propeller blade 121 in changing its pitch in response to a control function, moves the blade member 197 of the potentiometer 195 to a different position and the wires 284 and terminals *a*, *b*, *c*, communicate the blade position and blade angle changes that have been made back to the controller illustrated in Fig. 72.

Under certain conditions of propeller operation, it is desirable that the pilot take over control of the propeller operation and substitute his own control for the automatic control. That is effected by the blade angle control valve BCV that has a solenoid coil 316 connected by wire 310 thru terminal *i* to the controller of Fig. 72. The coil 316 when energized moves the plunger 643 such that passage 641 from the high pressure passage 520 is opened to the passage 646 leading to the pressure chamber 618 of the selector valve. Fluid pressure is thereby applied against the plunger 614 which shifts to a down position where ports 432 and 436 are connected, and where ports 435 and 440 are connected. Under that shifted position the ports 584 and 585 of the overspeed governor valve GV are reversed in their connection with respect to the servo chambers of the blade change servo 133. Increased pitch port 584 of the valve GV is now connected with 445, 435, 440, passage 428 and 154 with the increase pitch side of the blade actuating servo 133. The increase pitch chamber 140*a* drains thru 166, 437, 436, 432, 446 and 585 to the reservoir. The effect of fluid flow thru port 584 of the governor valve GV now accomplishes blade shift to negative thrust regime.

To summarize the hydraulic system as depicted in Fig. 71 the power source consists of three gear type pumps P1, P2 and P3. Two pumps P1 and P2 are system pumps and are driven by propeller rotation, they being used for normal propeller operation. The third pump is an electrically driven three-gear unit that is used for feathering, unfeathering and pitch change operation when the propeller is stationary or not rotating. The two system pumps P1 and P2 driven by the rotation of the propeller provide about 600 cubic inches of flow per minute, resulting in approximately 8° blade angle change per second. An extremely sensitive electric hydraulic valve SV providing full stroke oscillation, keeps the pitch changing system free.

The three-gear feathering pump P3 is an auxiliary pump and develops approximately 200 cubic inches of fluid flow at 500 p. s. i. A feathering pump pressure control valve FCV vents the supply from the feathering pump P3 into the electric motor housing for cooling purposes when the pressure reaches 500 p. s. i.

Maximum increase pitch hydraulic pressure developed is 2520 p. s. i. which is actually 600 p. s. i. greater than the actual required pressure. The increase compensates for pressure applied continuously to the decrease pitch side 140*b* of the piston 140. This prevents a reverse of pitch loads and aids the governing characteristics of the propeller.

A pressure control assembly PCV is contained in the system and determines minimum and maximum pressure. An equal area valve 502 insures operation of the gear pumps P1 and P2 at the minimum pressure required to maintain satisfactory control while the maximum pressure that can be developed by the system is determined by the pressure relief valve 511 which vents the excess oil to drain. In addition to the equal area and pressure relief valve, a reducer valve is utilized for oil bleed to the decrease pitch side 140*b* of the servomotor. The constant decrease pitch pressure on the primary supply line 418 vents to the decrease pitch side 140*b* of the blade servo units and keeps the system loaded in one direction while operating in the governing range. A centrifugally operated overspeed governor GV limits the output of overspeed in any control condition, and also serves as a standby feature in case of electronic governor inoperativeness. To eliminate the possibility of the overspeed governor GV calling for increase pitch when the governor is in negative pitch, a solenoid operated selector valve BCV is installed in the line from the overspeed governor GV. This selector valve reverses the sense of the overspeed governor, so that when an overspeed occurs, in negative the overspeed governor calls for a greater negative blade angle rather than decreasing the negative blade angle.

The hydraulic organization of Fig. 71 in adjusting the turbine-propeller combination for operation in either one of the several regimes is under the domination of the controller of Fig. 72, which provides control signals for the performance features of a governing range of scheduled speeds, direct blade angle control, feathering, unfeathering, and change from one to the other. Governing to a precise speed may be accomplished by means and mechanism such as disclosed and claimed in a copending application Ser. No. 94,984, now U. S. Patent No. 2,669,312, where the character and magnitude of electrical output from terminals 700 and 701 of a bridge network BR controls the operation of a multivibrator MV and an amplifier AMP in actuating a pulsing relay PR to alternately energize the windings of the solenoid valve with oppositely acting equal pulses during on-speed conditions, and with oppositely acting unequal pulses during off-speed conditions.

The governor consists essentially of two governing circuits, one voltage-sensitive and the other frequency-sensitive. The voltage sensitive governing circuit controls the speed of the turbine-propeller combination, within certain limits, by utilizing electrical circuits of bridge BR to balance a voltage representing the system speed against a reference voltage. The frequency-sensitive governing circuit acts as a vernier speed control on the operation of the voltage sensitive governing circuit. This vernier speed control provides a fine adjustment of system speed, and aids in synchronization of power plants in multi-engine installations. This governing circuit operates by balancing a frequency representing the system speed against a reference frequency developed by an electronic oscillator.

In the voltage sensitive governing circuit, a rectifier-filter-regulator combination R connected across one phase of the alternator 660 by wires 702, 703 derives a substantially constant voltage which is delivered as a reference voltage over wires 704, 705 to input terminals 706, 707 of the bridge BR. A rectifier-filter combination UR connected across the same alternator phase by wires 702, 708, 709, part of the resistor 710 and blade 711 of the speed setting potentiometer SP1, wire 712, and wires 713, 703, derives a voltage representing the system speed which is delivered over the wires 714, 715 to input terminals 716, 717 of the bridge BR. Wire connection 715 includes a potentiometer 718 as part of the vernier speed adjustment of the frequency sensitive system, and the variable resistance 719 as a calibration control. The bridge BR compares the voltages at input terminals 716 and 717 with the voltages at input terminals 706 and 707.

In the frequency-sensitive governing circuit a movable contact 720 of the potentiometer 718 is driven through a gear reduction by a motor under control of a discriminator DISC. The discriminator compares the frequency representing system speed from the three phase alternator 660 which is received over the wires 721, joining 708, wires 722, 723 joining 713, and wire 724, with the selected frequency from the oscillator OSCIL. The reference frequency of the oscillator is controlled through wires 725 connected with a resistor 726 of a speed control potentiometer SP2 whose blade 727 is operated by a link 728 extending from the coordinator 668 and under control by the pilots control lever 665. Any movement of the pilots control lever 665, due to its connection with the coordinator, actuates the link 728 that adjusts the movable contacts of all of the gang of potentiometers BP1, SP1 and SP2.

Potentiometer BP1 forms part of a control bridge network along with potentiometer 195 (Fig. 71) used in the blade angle control loop. Potentiometer SP1 constitutes part of the manual speed control and acts to adjust the input to UR. One phase of the alternator is impressed across the resistance 710 by wires 708, 709 connected to 702, and by wires 729, 723 and 713 connected to 703. Potentiometer SP1, will not alter the speed-voltage proportionality, and the output of UR will still change in proportion to the changing speed of the turbine. The purpose of this manual speed control is to balance the governor bridge BR at any desired speed by equalizing the potentials appearing at the opposite terminals of the bridge BR. Potentiometer SP2 constitutes a part of the vernier speed control and acts to adjust the oscillator frequency. A resistive portion 726 of the potentiometer SP2 has its movable contact 727 grounded at 730 and is connected by wire 725 with the oscillator OSCIL which impresses its frequency over 731 upon the discriminator DISC where it is compared with the frequency of the alternator 660, representing speed of the turbine-propeller combination and applied to the discriminator over wires 721, 722 and 724. The discriminator senses any difference in those frequencies and adjusts the governed speed by operating the motor M1 which adjusts the blade 720 of the potentiometer 718.

There are thus provided two D. C. voltages that are applied to the input of the bridge BR, one constant as a reference voltage at terminals 706, 707, and the other dependent upon turbine speed at terminals 716, 717. The bridge BR compares whatever voltages are applied at its input terminals and it manifests any differences at its output terminals 700 and 701. With the bridge balanced, both voltages equal, there will be potential difference between terminals 700 and 701. If for any reason the D. C. voltage applied to terminals 716, 717 of the bridge increases by an assumed 1 volt, then a potential difference of ½ volt will exist between terminals 700 and 701 of the bridge. Using the center point 732 of the bridge as a reference point, terminal 700 assumes a potential of −¼ volt and terminal 701 a potential of +¼ volt. These equal and opposite polarities will increase or decrease in proportion to the D. C. voltages applied between terminals 716 and 717, and will be reversed in the event of decrease of unregulated voltage applied to bridge input terminals 716, 717. A condition of no potential difference at terminals 700, 701 represents an on-speed condition of turbine propeller operation, and a condition of potential difference occurring at those terminals represents an off-speed condition.

The potentials occurring at terminals 700 and 701 of the bridge are applied in those magnitudes and polarities over wires 733, 734 to switch contacts 735, 736, switch blades 737, 738, wires 739 and 740 as D. C. bias potentials on the grids of vacuum tubes in a multivibrator MV, which multivibrator is the controlling source for electric pulses that actuate the solenoid valve SV located in the propeller. The multivibrator is of such design that it can be easily controlled so that the ratio and duration of output pulses can be continuously adjusted depending upon the relation of positive and negative potentials from the bridge output terminals over the wires 739 and 740. When the biases applied from bridge output terminals 700 and 701 are equal, then voltage pulses of equal duration will be produced and applied to the amplifier AMP. If the potential occurring at bridge output is more positive on one terminal and more negative on the other terminal, the duration of pulses produced by the multivibrator and delivered to the amplifier will be differentially changed, one becoming relatively longer and the other relatively shorter, and vice versa.

The amplifier AMP raises the control signals from the multivibrator to an increased power level and delivers them in alternate sequence over wires 741 and 742 to coils 743 and 744 of a pulsing relay PR, which coils have a common ground 745. The pulsing relay PR is a polarized relay and has a movable contact 746 adapted to engage fixed contacts 747 or 748 for connection to a 28 volt source line 749. Contacts 747 and 748 of the pulsing relay PR are connected by wires 750, 751 with contacts 752, 753 of governor disconnect relay GD. This relay has movable contacts 754, 755, connected by 756 and 757 with the pitch increase line 758 and the pitch decrease line 759, which communicate respectively with terminals g and h, which in turn communicate by wires 301 and 302 with the solenoid windings 303 and 304 of the solenoid valve SV.

Thus, while the pilot's control lever 665 is in the governing position speed errors of the turbine-propeller combination that are manifest at the bridge output terminals 700 and 701 are converted by the multivibrator MV to control signals that are amplified and applied in alternating sequence to the actuating coils of the pulsing relay PR, which in turn convert those signals into electric pulses for operation of the solenoid valve, such that the alternating pulses to opposite windings of the solenoid valve are equal during onspeed condition of operation and differentially unequal during off-speed condition of operation.

During operation under governed speed conditions, or while a switch arm 760 in the coordinator 668 is engaged with contact G, the governing circuit obtain as shown in Fig. 72. Current then flows from the 28 volt line 749 through 760, G and wire 761 to coil 762 of governor transfer relay TR which maintains movable contacts 737, 738 closed against fixed contacts 735, 736 perfecting the connections between the bridge BR and the multivibrator MV. When pilot's control lever 665 is moved to actuate the switch arm 760 it also actuates 670 for fuel control, and linkage 728 driving the movable contacts of the potentiometers BP1, SP1 and SP2. So long as the arm 760 engages the contact G, the controller will be set for governed speed operation at the speed selected by the potentiometers SP1 and SP2. The transfer relay TR will be energized and the movable contacts 737 and 738 will be down to engage the contacts 735, 736, so that only speed signals are applied to the multivibrator MV. The governer disconnect relay GD will be deenergized, and the movable contacts 754, 755 will be closed against fixed contacts 752, 753 completing the speed signal paths from the pulse producing unit to the control lines 758, 759.

If the pilot's control lever 665 is moved far enough in either direction to separate arm 760 from contact G, then the coil 762 of transfer relay TR will be deenergized and movable switch contacts 737, 738 will be released to engage fixed contacts 763, 764 to which are connected wires 765, 766, signal control lines from the blade angle control loop of the controller.

Referring to Figs. 71 and 72 control of the blade angle control signals impressed upon the wires 765, 766 is accomplished by a control bridge comprising a blade angle control potentiometer BP1 actuated by the control lever 665, and the potentiometer 195 actuated by the moving propeller blade 121. In this bridge circuit a resistance portion 767 has its ends connected by wires 768 and 769 thru terminals a and c and wires 293a and 293c with the ends of the resistance 195. A contact 770 movable over the resistance 767 is connected by wire 771, the series resistors 772 and 773 and wire 774 thru contact b, and thence by wire 293b with a propeller actuated movable contact 197. The common point of the series resistors 772 and 773 has a ground connection at 775, and across these resistors are connected the blade angle signal control lines 765 and 766 which lead to the fixed contacts 763 and 764 of the transfer relay TR. The connecting wires 768 and 769 are energized from a suitable current source PS over wires 776 and 777. Assuming that movement of the pilot control lever 665 is in an increased pitch direction, the switch arm 760 will be moved in a counterclockwise direction as shown to disengage the governor contact G. By the linkage 728 the movable contact 770 of control potentiometer BP1 is moved in a counterclockwise direction thereby unbalancing the control bridge so that there will be current flow in one direction over the wires connecting the movable contacts of the potentiometers and through resistors 772 and 773, and a potential difference will exist between the signal control wires 765 and 766. Since the switch 760 in the coordinator is disengaged from the contact G the winding 762 of transfer relay TR will be deenergized and the switch blades 737 and 738 will be in a retracted position engaging 763 and 764, connecting the blade angle signal lines 765 and 766 to the multivibrator MV.

Assuming that the pilot control lever 665 is moved in a decrease pitch direction and such that switch arm 760 disengages governor contact G then the movable contact 770 will be moved in a clockwise direction over the resistance 767 and the control bridge will be unbalanced in the opposite direction such as to produce current flow in the opposite direction, and develop a potential of opposite polarity between lines 765 and 766. The blade angle signals over wires 739 and 740, bias the multivibrator for differential pulse output to the amplifier AMP and the pulsing relay PR. Thus, a pulsing current passes from the D. C. source 749 thru contacts 747 and 748 which are connected with the solenoid control line 758 and 759 so long as the governor disconnect relay GD is deenergized. The blade angle control signals impressed upon the line 758 and 759 are transmitted to the solenoid valve SV thru the contacts g and h and wires 301 and 320 (Fig. 72). The solenoid valve operating as described causes fluid flow to the blade angle servo 133 which adjusts the blade 121. Whenever the blade 121 is adjusted the movable arm 197 of the potentiometer 195 moves in the corresponding direction until the control bridge is rebalanced. When this control bridge is in balance there will be no current flow across the middle taps 770 and 197 of the potentiometers and hence no signal control over the wires 765 and 766 to the multivibrator.

For negative pitch operation, the pilot's control lever 665 is moved far enough that switch arm 760 closes with negative contact N which is connected by wire 778 and terminal i and thence by wire 310 with the coil 316 of the selector control valve in the propeller regulator. The selector valve will shift in position to reverse the fluid connections between the servomotor 133 and the control valve GV. The control bridge will be unbalanced in the manner set forth in the preceding paragraph to effect energization of the solenoid valve resulting in fluid flow to the servomotor 133. The servomotor will move the blade 121 from a positive pitch position to a negative pitch position, aided by the fluid flow from the control valve GV which now directs flow to the decrease pitch chamber 140b through line 445, ports 435 and 440 of the selector valve, line 428 and line 154. Movement of the lever 665 out of the negative range disengages the switch arm 760 from the contact N and deenergizes the selector control valve solenoid 316, and the selector valve restores the fluid connections for normal positive pitch operation.

Feathering may be accomplished at any time without regard to position of the pilot's control lever 665. A feather control switch FC has a pair of movable contacts 779 and 780 which, when moved to the feathering position F apply current from source line 749 to fixed contacts 781 and 782. Contact 782 connects by wire 783 with a field winding 784 of a timing motor TM, and also connects with a movable contact 785 normally engaging a fixed contact 786 connected by a wire 787 by-passing the timing motor TM, and connected with a coil 788 and ground 789 of a feathering relay FR. The motor TM has a linkage 790 connected with movable contact 785 and is so operated that at the end of a specified time contacts 785 and 786 disengage deenergizing coil 788 of the feathering relay FR. The feathering relay FR when energized closes movable contacts 791 and 792 against fixed contacts 793 and 794, so that electric energy from 749 is applied to wires 795 and 758. Wire 795 joins 796 that leads to magnet coil 797 and ground of a feathering motor relay switch FM. Wire 758 is the increase pitch signal line connecting with terminal g that connects by wire 301 of regulator to the increase pitch side of the solenoid valve SV.

Movable contact 779 of the feather control switch FC when engaged with contact 781 applies battery current from 749 to wire 798 joining wire 799 and coil 800 to ground of a disconnect hold relay DH. Battery current is also applied by that connection to movable contact 801 of an unfeathering relay UF which movable contact normally engages a fixed contact 802 connected by wire 803 to wire 804 and wire 805 leading to coil 806 and ground of the governor disconnect relay GD. The coil 800 of disconnect hold relay DH closes movable contact 807 against fixed contact 808 that is attached to wire 804 leading by 805 to the coil winding 806 of the governor disconnect relay GD. Energization of the relay coil 800 also moves contact 809 out of engagement with contact 810 which connects with the decrease pitch control line 759 preventing energization of the decrease pitch side of valve SV. The energization of the coil of governor disconnect relay GD separates movable contacts 754, 755 from fixed contacts 754, 753 thereby interrupting all connections between the governor and the pitch control lines 758 and 759. Due to these connections made a continuous flow of current from source 749 flows thru contacts 792, 794 and over the increase pitch line 758 thru terminal g to the increase pitch side of the solenoid valve SV. That flow continues so long as the feathering relay FR is energized. The feathering motor relay FM, being energized so long as feathering relay FR is energized, moves switch blades 811, 812 and 813 into engagement with fixed contacts 814, 815, and 816 leading by terminals f, e and d and wires of cable 300 to the feathering motor M which drives the pump P3 located in the regulator. The movable contacts 811, 812 and 813 connect by wires 817, 818 and 819 to a suitable source of electric current 820 for operating the feathering pump motor M. If the propeller is rotating and pumps P1 and P2 supplies sufficient fluid under pressure to elevate the flow control valve FCV to the position shown in Fig. 71 the output of pump P3 will be discharged thru outlet 451 and motor housing to return to the reservoir. If the propeller is not rotating or if the delivery to chamber 561 of the flow control valve is insufficient to raise the plunger 553 then the discharge of pump P3 will be thru the check 548 into the trunk line 422.

Unfeathering is accomplished by moving the feathering control switch FC to the unfeathering position UF in which position the movable contact 779 and 780 engage fixed contacts 821 and 822 applying battery thereto. Contact 822 connects by wire 796 with the energizing coil 797 of the feathering motor control relay FM which when energized connects the current source 820 with a feathering pump motor M. Contact 821 of the feathering control switch FC connects by wire 823 with a coil 824 and ground of an unfeathering relay UF which when energized opens contacts 801 and 802 and closes movable contacts 825 with fixed contact 826 which is connected by wire 759 to the decrease pitch control side of the solenoid SV thru the contact h. Closing of contacts 825 and 826 also energizes coil 806 of the governor disconnect relay GD by reason of the closed condition of contacts 809 and 810 of the disconnect hold relay DH which is now deenergized. When the unfeathering is called for the pilot's control lever 665 is usually in governing position so that current from the source 749 is applied to the wire 761 connecting with the coil 762 of the transfer relay TR. This relay when energized connects the governor bridge BR with the multivibrator MV so that the governor circuit is set up and ready to control the propeller operation as soon as the feather control switch FC is opened from the unfeathering position. Opening the unfeathering switch deenergizes the unfeathering relay UF and deenergizes the governor disconnect GD whereupon movable contacts 754 and 755 engage contacts 752 and 753 reestablishing the governor control circuits over the pitch control lines 758 and 759.

To summarize the control effected by the controller of Fig. 72 it will be observed that in the governing range the propeller speed is controlled by an electric governor whose output signal supplies the proper pulse ratio to the solenoid valve in the propeller regulator. During governing, this pulse ratio is such as to maintain the speed selected by the potentiomters SP1 and SP2. For blade angle control the output of the electric governor is also used, but the pulse ratio of the output is determined by different means. When the govern-blade angle switch 760–G is in the blade angle position, the multivibrator which forms the output forces is entirely disconnected from the alternator and oscillator signals which control it during governing. Instead the multivibrator is controlled directly by a voltage signal from any unbalance between the potentiometer DP1 and the blade actuated potentiomter 195. Under these conditions the controller output is entirely independent of propeller speed and is sensitive only to blade angle change.

Feathering is accomplished by energizing the feathering relay FR thru the feather switch FC and the timer switch TM which holds the circuit closed for a preset time interval. While the feather relay is closed, it disconnects the governor output, energizes the increase pitch coil of the solenoid valve SV, and operates a feathering motor control relay FM which connects the feathering M to a three-phase voltage supply 820. The feather relay FR insures that the governor will remain disconnected until the propeller has been unfeathered. To unfeather the propeller the unfeathering relay UF and the feathering switch FC energizes the decrease pitch coil of the solenoid valve and the feather motor relay FM while keeping the governor disconnected until the switch FC is returned to the off position.

While the embodiments of the present invention as herein disclosed, constitute a preferred form, it is to be understood that other forms might be adopted.

What is claimed is as follows:

1. In an aircraft structure the combination comprising, a gear reduction unit providing a fixed sleeve and having a gear with a splined sleeve rotatably mounted on said fixed sleeve and driven by said gear reduction an aircraft propeller component supported by and driven by the gear reduction unit, said component comprising a tubular propeller shaft removably mounted in fixed relation within said gear unit, a propeller hub rotatably mounted upon the fixed shaft and providing pitch shiftable blades, driving connections between the hub and splined sleeve, and means securing the propeller component in the fixed sleeve of the gear reduction whereby the propeller hub structure and propeller shaft may be removed from the gear reduction as a unit.

2. A turbine-propeller combination for aircraft comprising, a turbine, a gear reduction driven by the turbine, a fixed tubular shaft supported by the gear reduction, a propeller unit having controllable pitch blades mounted for rotation upon said shaft, said propeller unit comprising, a plurality of hubs each rotatably supporting a plurality of blades, means interconnecting said hubs for rotation in unison and axially spacing the said hubs upon said shaft, means angularly spacing the blades of one hub with respect to the blades of an adjacent hub so as to maintain the blades of one hub at a fixed lead angle with respect to the blades of said adjacent hub, means for driving the propeller unit from the gear reduction, and means extending through the tubular shaft for controlling the pitch movement of the blades of both hubs.

3. A turbine-propeller combination for aircraft comprising a turbine, a gear reduction driven by the turbine, a fixed tubular shaft supported by the gear reduction, a propeller unit having controllable pitch blades mounted for rotation upon said shaft, said propeller unit comprising two stages each including a hub and pitch shiftable blades, means fixedly securing one stage with respect to the other stage to provide axial spacing between the stages and angular lead of the blades in one stage with respect to the blades of the other stage, bearing means at the front of one stage and at the rear of the other stage for rotatably mounting the propeller unit upon said fixed shaft, and means extending from the gear reduction for controlling the pitch shift movement of the blades of both stages.

4. The combination set forth in claim 3 wherein a masted gear rotatably engages the blades of each stage for maintaining equal angular adjustment of all the blades of the respective stage, and a sleeve drivingly engages the master gear of each stage for maintaining pitch shift movement of the blades of one stage equal to the pitch shifting movement of the blades of the other stage.

5. In an aircraft structure the combination comprising, a propeller drive gear unit, a fixed sleeve secured in the drive gear unit, a propeller drive gear journalled on the sleeve, a propeller component removably mounted in the drive gear unit and comprising a fixed tubular shaft mounted within the fixed sleeve so as to be readily removable therefrom, with a propeller hub rotatably supported on the fixed shaft, and splined driving means between the propeller drive gear and propeller hub.

6. A propeller structure for aircraft comprising in combination, a fixed tubular shaft, a propeller unit having bearings for supporting it in rotatable relation upon the fixed shaft, said propeller unit comprising a pair of propeller stages each providing a hub having pitch shiftable blades, means interposed between the hubs spacing them axially and interconnecting said hubs for rotation in unison, means including said spacing means angularly spacing the blades of one stage in advance of the blades of the other stage, blade angle change mechanism provided by each stage for adjusting the pitch of the blades of the corresponding stage, and means extending between the stages equalizing the pitch shift movement of one stage with respect to the other stage, and fluid pressure control means rotatable with the propeller unit for coincidentally operating all of the blade angle changing mechanism.

7. A propeller structure for aircraft comprising in combination, a fixed tubular shaft, a propeller unit having bearings for supporting it in rotatable relation upon the fixed shaft, said propeller unit comprising a pair of propeller stages each providing a hub having pitch shiftable blades, means rigidly connecting the hubs in axially spaced relation and the blades of one hub angularly advanced with respect to the blades of the other hub to overcome shock interference between the blades of one stage and the blades of the other stage, fluid pressure means in each stage for adjusting the blades in pitch, and means transmitting the adjustment of the blades in one stage to the adjustment of the blades in the other stage, a hydraulic organization rotatable with the propeller unit for actuating the fluid pressure means of both stages, an electrical controller for controlling the hydraulic organization to effect predetermined pitch shift movement of the blade, and electrical means actuated by the adjustment of the blades for interrupting the action of the electric controller when the predetermined pitch shift movement of the blades has been accomplished.

8. The combination set forth in claim 7 wherein, a multiconductor cable is disposed within the fixed tubular shaft, and brush and slip rings carried by the propeller and fixed tubular shaft transmit the energy from the controller to the hydraulic organization while the propeller is rotating.

9. A propeller structure for aircraft comprising in combination, a fixed tubular shaft, a propeller unit having bearings for supporting it in rotatable relation upon the fixed shaft, said propeller unit comprising a pair of propeller stages each providing a hub having pitch shiftable blades, tubular means surrounding the fixed tubular shaft and securing the hubs in fixed axial and angular relation one with respect to the other, gear means in each hub engaging all the pitch shiftable blades of the respective stage, a splined sleeve drivingly engaging the gear means of one hub with the gear means of the other hub, fluid pressure means for coincidentally actuating all of the pitch shiftable blades, and means including the splined sleeve for initiating the pitch shift movement of all the blades.

10. A propeller structure for aircraft comprising in combination, a fixed tubular shaft, a propeller unit having bearings for supporting it in rotatable relation upon the fixed shaft, said propeller unit comprising a pair of propeller stages each providing a hub having pitch shiftable blades, means interconnecting said hubs for rotation in unison, fluid pressure means in each hub for adjusting the pitch shiftable blades, a hydraulic organization carried by one of the hubs for developing fluid pressure and distributing the fluid pressure to the blade shifting means of each hub, and an electric controller for controlling the hydraulic organization.

11. A propeller structure for aircraft comprising in combination, a fixed tubular shaft, a propeller unit having fore and aft bearings for rotatably supporting the unit upon the fixed shaft, means for driving the propeller unit, said propeller unit having radially extending blade sockets, controllable pitch blades rotatably secured in said sockets, blade adjusting servomotors in the hub, said servos comprising a fluid pressure cylinder connected with the blade for rotation thereof, a fixed helical spline member and an interengaging splined piston, a floating member within the hub having portions concentric with said socket, means securing the fixed spline member to the concentric portion of said floating member, and fluid pressure means connected with said floating member for applying fluid pressure to either side of said piston.

12. A turbine-propeller combination for aircraft comprising, a turbine, a propeller drive gear driven by the turbine, a fixed shaft extending from the drive gear, a propeller unit rotatably mounted on the shaft and driven by the propeller drive gear, said propeller unit comprising a pair of propeller hubs secured together in tandem relation, each of said hubs providing a plurality of controllable pitch blades staggered with relation to the blades of the other hub, fluid pressure actuated means rotatable with the propeller unit for adjusting the pitch of the blades, and an electric controller connected into the fluid pressure actuated means for controlling the pitch shift movement of the blades.

13. A propeller assembly for aircraft comprising in combination, a fixed tubular shaft, a propeller hub mounted for rotation on the fixed shaft, controllable pitch blades mounted on the hub, fluid actuated servos for adjusting the blades, and a hydraulic regulator carried by the hub and operable upon rotation of the propeller to develop and distribute fluid pressure to said servos, said regulator including a reservoir containing a quantity of fluid medium, gear pumps for circulating fluid medium, one of said pumps being electric motor operated, control valves for directing the circulation of fluid medium from the pumps, one of said control valves being electrically operated, brush and slip ring provisions outside of the regulator for transferring electric current to the electric operated pump and control valve, and means extending through the fixed tubular shaft for controlling the energization of the electric motor and electric valve.

14. A propeller structure for aircraft comprising in combination, a fixed shaft, a propeller having controllable pitch blades rotatably mounted on the fixed shaft, fluid pressure operated means in the hub for adjusting the pitch of the blades, a hydraulic regulator providing a reservoir rotatable with the propeller hub, said reservoir comprising a U-shaped housing surrounding the fixed shaft, fixed sleeve members secured to the fixed shaft for closing the inner bounds of the U-shaped housing and for retaining a quantity of fluid medium therein, fluid pressure developing and distributing means mounted in the reservoir for circulating the fluid under pressure to and from the blade adjusting means, said means for distributing fluid pressure including an electric valve, electric slip rings carried by the U-shaped housing and connected with the electric valve, a series of electric brushes supported by the fixed shaft, an electric controller, and means connecting the electric controller to said brush means.

15. A propeller structure for aircraft comprising a hub provided with controllable pitch blades, electro-hydraulic means for adjusting the blades, and including an hydraulic regulator and an electric controller, said hydraulic regulator comprising a base plate rotatable with the propeller, fluid pressure pumps and control valves mounted upon the base plate and adapted to withdraw and circulate a fluid medium, a cover member secured to the plate enclosing the pumps and control valves to provide a reservoir for a fluid medium, seal means engaging the base plate and cover member to prevent loss of the fluid medium, said control valves comprising an electric valve, slip rings rotatable with the cover member, and conductor means mounted on the cover member for connecting the slip rings with the electric valve.

16. The combination set forth in claim 15 wherein, said slip rings are of cylindrical form, and electric brushes arranged in cylindrical form circumscribe and are urged radially inwardly to engage said slip rings.

17. A propeller structure for aircraft comprising a hub provided with controllable pitch blades, electro-hydraulic means for adjusting the blades, and including an hydraulic regulator and an electric controller, said hydraulic regulator comprising a base plate rotatable with the propeller, fluid pressure pumps and control valves mounted upon the base plate, a cover member secured to the base plate for enclosing said pumps and control valves and providing a fluid containing reservoir, a relatively fixed part within the reservoir with respect to which the propeller rotates, radially extending pick-up tubes carried by said relatively fixed part, said relatively fixed part providing passages connecting with the pick-up tubes, a circular channel provided by the base plate into which said passages open, passage means connecting the channel with the pump intake, and means on said relatively fixed part for driving the pumps when the propeller rotates.

18. A propeller structure for aircraft comprising a hub provided with controllable pitch blades, electro-hydraulic means for adjusting the blades, and including an hydraulic regulator and an electric controller, said hydraulic regulator comprising a base plate rotatable with the propeller, fluid pressure pumps and control valves mounted upon the base plate, a cover member secured to the base plate for enclosing said pumps and control valves and providing a fluid containing reservoir, a relatively fixed part within the reservoir with respect to which the propeller rotates, said control valves including an electric valve differentially operable to selectively distribute fluid under pressure to the blade adjusting means, means carried by the cover for conducting current to the electric valve, and brush and slip rings carried by the relatively fixed part and cover for transmitting electric current to the electric valve from an outside source.

19. A propeller structure for aircraft comprising a hub provided with controllable pitch blades, electro-hydraulic means for adjusting the blades, and including an hydraulic regulator and an electric controller, said hydraulic regulator comprising a base plate rotatable with the propeller, fluid pressure pumps and control valves mounted upon the base plate, a cover member secured to the base plate for enclosing said pumps and control valves and providing a fluid containing reservoir, a relatively fixed part within the reservoir with respect to which the propeller rotates, said control valves including a blade angle control valve comprising a selector valve and an electrically operated servo control valve, conductor means carried by the cover, slip rings carried by the cover, brushes engageable with the slip rings and supported from the relatively fixed part for completing the connection between the controller and the servo control valve.

20. A propeller structure for aircraft comprising a hub provided with controllable pitch blades, electro-hydraulic means for adjusting the blades, and including an hydraulic regulator and an electric controller, said hydraulic regulator comprising a base plate rotatable with the propeller, fluid pressure pumps and control valves mounted upon the base plate, a cover member secured to the base plate for enclosing said pumps and control valves and providing a fluid containing reservoir, a relatively fixed part within the reservoir with respect to which the propeller rotates, said control valves including an overspeed governor valve having an oscillatable lever engageable with said relatively fixed part, and cam means on said relatively fixed part for oscillating the lever during propeller rotation.

21. A propeller assembly for aircraft comprising in combination, a supporting shaft, a hub shell having a central bore for mounting upon said shaft, a plurality of sockets provided by the hub shell radiating from the central bore, propeller blades having shanks rotatably mounted in each socket and including thrust bearings, said thrust bearings including outside race members secured within the socket, integrally formed inner race ways provided by the blade shank, blade adjusting means disposed within the blade shank, including a cylindrical portion ending in a tooth gear segment, a splined index ring interengaging the interior of said blade shank and the exterior of said cylindrical portion, a radial bearing for the cylindrical portion, and a floating member within the central bore of said shell for supporting the radial bearing, and means whereby said floating member supports the blade adjusting means.

22. A propeller assembly for aircraft comprising in combination, a hub shell providing a central bore and radially extending blade sockets, a supporting shaft extending thru the central bore of said shell, bearing means rotatably supporting the hub shell upon said shaft, a floating member encompassing in the shaft and disposed within the bore of said hub shell, said floating member having flanged portions concentric with said blade sockets, a splined sleeve secured in nonrotative relation with said flanged portion, a rotatable spline member having a radial bearing upon said floating member, a torque applying member having splined engagement with both said splined sleeve and rotatable spline member, a blade having a hollow root portion whose inner diameter is splined, an indexing ring having splined engagement with the exterior of said rotatable spline and with the interior spline portion of said blade root, and ball thrust bearings securing the blade within the blade socket and engaging the adjusting means.

23. A propeller assembly for aircraft comprising in combination, a hub shell having a central bore for mounting upon a shaft, a plurality of sockets provided by the hub shell and radiating from the central bore, propeller blades with hollow roots rotatably mounted in each socket, and blade adjusting devices disposed within the blade root and adapted to rotate the blade with respect to the hub shell, a floating member disposed within the central bore of the hub shell and providing turret portions each concentric with a blade socket, means including said turret portion for supporting said blade adjusting means.

24. A propeller assembly for aircraft comprising in combination, a propeller hub mounted for rotation, blades having roots rotatably mounted in said hub for pitch change adjustment, and blade adjusting means for adjusting the blades at will said blade adjusting means comprising, a floating member within the hub shell having pilot portions concentric each with a blade socket, a fixed helical spline member secured to each pilot portion, a rotatable spline portion rotatably supported on said pilot portion, and means interengaging said rotatable spline portion and the interior of said blade root whereby rotary movement of the rotatable spline rotates said blade root, and means within the blade changing mechanism interengaging the said fixed spline and rotary spline member.

25. In combination, a propeller unit having controllable pitch blades, electrohydraulic means for adjusting the blades to effect propeller operation to suit a selected regime, said electro-hydraulic means including an hydraulic regulator rotatable with the propeller unit, and an electric controller for effecting propeller operation in the regimes of governing, blade angle control, feathering and negative pitch, said hydraulic regulator embodying an hydraulic organization for developing a source of fluid under pressure in response to propeller rotation, pressure control means for regulating the potential of the source pressure to fit the needs for adjusting the blades under the particular regime of propeller operation, and pressure distributing means responding to the electric controller for applying the regulated pressure to the blade adjusting means.

26. The combination set forth in claim 25 wherein, the pressure distributing means includes an electric valve adapted to apply the regulated pressure for either increase pitch movement or decrease pitch movement of the blades, and said electric controller being selective operable upon the electric valve for effecting either increase pitch change or decrease pitch change, and means actuated by the blades in changing pitch for interrupting the operation of the controller when the blades have reached an adjusted position satisfying the selected regime of propeller operation.

27. In combination, a propeller unit having controllable pitch blades, electro-hydraulic means for adjusting the blades to effect propeller operation to suit a selected regime, said electro-hydraulic means including an hydraulic regulator rotatable with the propeller unit, and an electric controller for effecting propeller operation in the regimes of governing, blade angle control, feathering and negative pitch, said hydraulic regulator embodying an hydraulic organization for developing a source of fluid under pressure and for distributing the pressure fluid developed to the blade adjusting means, pressure control means open to the source of fluid pressure for regulating the potential of the pressure in accordance with the needs for effecting blade adjustment in a selected regime, control valves in said hydraulic organization for distributing the regulated pressure, said control valves including an electric valve selectively operable by the electric controller.

28. In combination, a propeller unit having controllable pitch blades, electro-hydraulic means for adjusting the blades to effect propeller operation to suit a selected regime, said electro-hydraulic means including an hydraulic regulator rotatable with the propeller unit, and an electric controller for effecting propeller operation in the regimes of governing, blade angle control, feathering and negative pitch, said hydraulic regulator embodying an hydraulic organization for developing a source of fluid under pressure a high pressure passage for delivering the source of fluid pressure to the blade adjusting means, a pressure control valve open to the high pressure passage for regulating the potential of pressure admitted to the blade adjusting means, and control valves for selectively applying the regulated pressure to the blade adjusting means for effecting blade adjustment to satisfy the selected regime of propeller operation.

29. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, means in said regulator providing a source of fluid under pressure, control valves in said regulator for applying fluid pressure for increase pitch and decrease pitch adjustment of the blades in response to intelligence from said electric controller, means providing passages connecting the fluid pressure source with the control valves, means in said connecting passages for regulating the potential of the source pressure applied to the control valves to suit the needs of blade adjustment called for by the control valves, a pressure reducer valve connected with said source of pressure for applying a constant low pressure potential to the pitch change means tending to decrease the blade pitch.

30. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, means in said regulator providing a source of fluid pressure, control valves in said regulator having pressure supply ports open to said pressure source, and control ports connected with said servo motors, means in said regulator and connected with said pressure source providing a low pressure potential constantly applied to said servo motor tending to reduce pitch of the propeller blades, one of said control valves including an electric valve for applying pressure from said source to either side of said servo motors.

31. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, said regulator providing a source of fluid pressure, and control valves for selectively distributing the fluid pressure to the reversible fluid servo motors, one of said control valves having opposed solenoids for reciprocating the valve from a central position, said electric controller including a pulse generating means for alternately energizing said solenoids, and means energizing the pulse producing means providing a differentially alterable ratio of alternate pulses whereby said valve solenoids may hold the said control valve to one side of the central position longer than it holds the valve to the other side of the central position.

32. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, said regulator providing a source of fluid pressure, and control valves for selectively distributing fluid pressure to either side of the fluid servo motors, one of said control valves having a control port connectible with the fluid servo motor for increasing the blade pitch to prevent over-speed operation of the propeller unit, a pressure reducer valve connected with said source, and passages connecting the pressure reducer valve with the fluid servo motor for loading the fluid servo motor against increase pitch change, and another of said control valves having operating solenoids for applying pulses of fluid pressure alternately to opposite sides of said fluid motor, means including the electric controller for operating said last named control valve in a manner to produce equal alternate pulses during no change conditions of said servo motor, and to provide unequal alternate pulses during changing conditions of said servo motor.

33. In combination, a propeller unit having controllable pitch blades, reversible fluid servo motors for adjusting the blades to increase pitch or decrease pitch, electro-hydraulic means for actuating the servo motors to effect propeller operation to suit a selected regime, said electro-hydraulic means including an hydraulic regulator rotatable with the propeller, and an electric controller for applying blade control intelligence to the regulator, said regulator providing a source of fluid pressure, and an electric control valve for selectively distributing the fluid pressure to opposite sides of the reversible fluid servo motor, means including said electric controller for reciprocating said control valve to produce no change in the servo motors when the propeller unit is operating on-speed, means including the electric controller for reciprocating said electric valve to provide a changing condition in said servo motor when said propeller unit is operating at off-speed, means including said electric controller for moving said electric valve to a position for distributing fluid pressure to one side only of the servo motor in selecting a new speed setting, and means in said regulator operable by said electric controller for applying source pressure to one side only of the servo motors to effect blade pitch change to accomplish a negative thrust regime of propeller operation.

34. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, said regulator providing a source of fluid pressure, an electric control valve for selectively distributing the fluid pressure alternately to opposite sides of the servo motor, means including said electric controller for reciprocating said control valve to produce alternate fluid pulses of equal magnitude when the propeller unit is operating on-speed, and unequal alternate pulses when the propeller unit is operating off-speed, means conducting the alternate pulses produced by said electric valve to opposite side of the servo motors, an over-speed governor valve having a control port with connections for supplying continuous fluid flow to the increase pitch side of said servo motor, for marking the high speed limits of propeller operation in the positive thrust range, a selector valve for transferring the control port of the overspeed governor valve to the decrease pitch side of the servo motor for negative thrust operation of said propeller unit, and means including said electric controller for operating said selector valve when the propeller unit is to be operated in the negative thrust regime in lieu of the positive thrust regime.

35. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electrohydraulic means including an hydraulic regulator rotatable with the propeller, and an electric controller for applying blade control intelligence to the regulator, said regulator providing a source of fluid pressure, an electric control valve for selectively distributing the fluid pressure alternately to opposite sides of the servo motors, means including said electric controller for reciprocating said control valve to produce alternate fluid pulses of equal magnitude when the propeller unit is operating on-speed, and unequal alternate pulses when the propeller unit is operating off-speed, means conducting the alternate pulses produced by said electric valve to opposite side of the servo motors, an overspeed governor valve in said regulator operable as the propeller unit approaches an unsafe speed condition for increasing the blade pitch, means in said electric controller for cancelling blade adjustment by the control valve and for substituting manual adjustment of said blades by the pressure source in lieu of said control valve to effect feathering and unfeathering regimes of propeller operation.

36. In combination, a propeller unit having controllable pitch blades, reversible fluid servo motors for adjusting the blades to increase pitch or decrease pitch, electro-hydraulic means for actuating the servo-motors to effect propeller operation to suit a selected regime, said electro-hydraulic means including an hydraulic regulator rotatable with the propeller, and an electric controller for applying blade control intelligence to the regulator, means in said regulator providing a source of fluid pressure, a control valve for applying the pressure to the reversible fluid motor, means included in said electric controller for operation of the control valve to effect governed speed operation, specific speed levels at which governed speed operation shall be maintained, and blade pitch adjustment for propeller operation outside of a selected range of governed speed, means including in said electric controller for selecting a negative thrust regime of propeller operation and means in said adjusted controller operable upon the regulator to effect propeller operation in the regimes of feathering and unfeathering.

37. In combination, a controllable pitch propeller, an alternator driven by the propeller and having an output proportional to propeller speed, a controller responsive to speed intelligence from said alternator, a coordinating control for establishing a reference speed intelligence in said controller, said controller applying blade angle and speed intelligence to the propeller, a feed back from said propeller to the controller providing blade angle intelligence as a factor of speed and of blade angle, and a single control lever operable upon the coordinating control for selecting speed control of the propeller or blade angle control of the propeller.

38. A variable pitch propeller including, in combination, a pair of axially spaced propeller units, each propeller unit including a hub having a plurality of blades journaled for rotation about their longitudinal axes to different pitch positions, means interconnecting said hubs for rotation in unison, the blades of one hub being angularly spaced with respect to the blades of the other hub, and power means carried by said propeller units for varying the pitch position of the blades in said hubs.

39. A variable pitch propeller including, in combination, a pair of axially spaced propeller units, each propeller unit including a hub having a plurality of blades journaled for rotation about their longitudinal axes to different pitch positions, means interconnecting said hubs for rotation in unison, the blades of one hub being angularly spaced with respect to the blades of the other hub, power means carried by said propeller units for varying the pitch position of the blades in said hubs, and means interconnecting the blades of each hub for coordinating their movement by said power means.

40. A propeller structure for aircraft including in combination, a fixed tubular shaft, a propeller unit having bearings for rotatably supporting the propeller unit upon the fixed shaft, fluid pressure operated means in the propeller unit for coincidentally adjusting all blades in said propeller unit, a fluid pressure organization rotatable with the propeller unit for actuating the fluid pressure operated means, said fluid pressure organization comprising fluid pressure developing means actuated by propeller rotation, fluid pressure distributing means for applying fluid under pressure to the blade adjusting means, an electric controller having connection with the fluid pressure organization through said tubular shaft for dictating to the fluid pressure organization the blade adjustment that should be accomplished, and electrical means actuated by pitch adjusting movement of the blades in accomplishing the selected pitch adjustment for interrupting further dictation by the electric controller.

41. A propeller structure for aircraft including in combination, a fixed tubular shaft, a propeller unit having fore and aft bearings for rotatably supporting the unit upon the fixed shaft, means for rotating the propeller unit, said propeller unit having radially extending blade sockets, controllable pitch blades rotatably mounted in said sockets, blade adjusting servo motor unit means in the propeller unit comprising a reversely operable piston and cylinder combination having a rotatable part drivingly connected to the blade and a relatively fixed part, an island member circumscribing the fixed tubular shaft and disposed between said fore and aft bearings, means on said island rigidly supporting said relatively fixed parts of the servo motor means, a propeller borne fluid pressure system for actuating the servo motor means, fluid connections between the fluid pressure system and the servo motor means including passages through said island, electric valve means for controlling the application of pressure fluid from the system to the servo motor means, and an electric controller having connections through the tubular shaft for actuating said electric valve means.

References Cited in the file of this patent

UNITED STATES PATENTS

| | | |
|---|---|---|
| Re. 23,253 | Blanchard et al. | Aug. 15, 1950 |
| 1,338,116 | Zumwalt | Apr. 27, 1920 |
| 1,415,092 | Hunt | May 9, 1922 |
| 1,438,289 | Barbarou | Dec. 12, 1922 |
| 1,987,650 | Weigand | Jan. 15, 1935 |
| 2,229,058 | Dicks | Jan. 21, 1941 |
| 2,285,592 | Ledwinka | June 9, 1942 |
| 2,320,195 | Rindfleisch | May 25, 1943 |
| 2,457,595 | Orr | Dec. 28, 1948 |
| 2,474,143 | Forsyth | June 21, 1949 |
| 2,494,368 | Steele et al. | Jan. 10, 1950 |
| 2,501,617 | Roesch | Mar. 21, 1950 |
| 2,516,200 | Geyer | July 25, 1950 |
| 2,522,083 | Avondoglio | Sept. 12, 1950 |
| 2,600,017 | Morris et al. | June 10, 1952 |
| 2,665,082 | Anderson | Jan. 5, 1954 |